(12) United States Patent
Gotrik et al.

(10) Patent No.: US 12,228,755 B2
(45) Date of Patent: Feb. 18, 2025

(54) RETROREFLECTIVE ARTICLE COMPRISING MULTIPLE LOCALLY-LAMINATED LAYERS

(71) Applicant: 3M INNOVATIVE PROPERTIES COMPANY, St. Paul, MN (US)

(72) Inventors: Kevin W. Gotrik, Hudson, WI (US); Kui Chen-Ho, Woodbury, MN (US); Graham M. Clarke, Woodbury, MN (US); Scott J. Jones, Woodbury, MN (US); Michael A. McCoy, St. Paul, MN (US); Shri Niwas, Maple Grove, MN (US); David J. Rowe, Roseville, MN (US); Tien Yi T. H. Whiting, St. Paul, MN (US); Ying Xia, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 674 days.

(21) Appl. No.: 17/605,654

(22) PCT Filed: Apr. 24, 2020

(86) PCT No.: PCT/IB2020/053886
§ 371 (c)(1),
(2) Date: Oct. 22, 2021

(87) PCT Pub. No.: WO2020/217220
PCT Pub. Date: Oct. 29, 2020

(65) Prior Publication Data
US 2022/0214478 A1  Jul. 7, 2022

Related U.S. Application Data

(60) Provisional application No. 62/838,569, filed on Apr. 25, 2019.

(51) Int. Cl.
*G02B 5/128* (2006.01)
(52) U.S. Cl.
CPC ..................... *G02B 5/128* (2013.01)
(58) Field of Classification Search
CPC .... G02B 5/128; G02B 5/288; B32B 37/0084; B32B 37/025; B32B 37/1292; B32B 37/144; B32B 37/18; B32B 33/00
(Continued)

(56) References Cited

U.S. PATENT DOCUMENTS 3,700,305 A * 10/1972 Bingham ............... G02B 5/128
359/540
4,418,110 A * 11/1983 May ........................ G09F 13/16
428/913

(Continued)

FOREIGN PATENT DOCUMENTS

EP          0305074        3/1989
WO    WO 2017-197223      11/2017
(Continued)

OTHER PUBLICATIONS

International Search Report for PCT International Application No. PCT/IB2020/053886, mailed on Jun. 17, 2020, 5 pages.

*Primary Examiner* — Cara E Rakowski
*Assistant Examiner* — Jennifer A Jones
(74) *Attorney, Agent, or Firm* — Kenneth B. Wood

(57) ABSTRACT

A retroreflective article comprises a binder layer and a plurality of retroreflective elements, each retroreflective element comprising a transparent microsphere partially embedded in the binder layer. At least some of the retroreflective elements comprise a first locally laminated layer and a second locally laminated layer that may be reflective layers. A transfer article comprises a disposable carrier layer in which the retroreflective article is detachably disposed (Continued)

with at least some of the transparent microspheres in contact with the disposable carrier layer.

22 Claims, 8 Drawing Sheets

(58) Field of Classification Search
USPC ....... 359/534, 535, 537, 536, 538, 539, 540, 359/541, 542
See application file for complete search history.

(56) References Cited

U.S. PATENT DOCUMENTS

| | | | |
|---|---|---|---|
| 4,763,985 A | 8/1988 | Bingham | |
| 5,110,655 A | 5/1992 | Engler | |
| 5,283,101 A | 2/1994 | Li | |
| 5,812,317 A | 9/1998 | Billingsley | |
| 6,024,455 A | 2/2000 | O'Neill | |
| 6,172,810 B1 | 1/2001 | Fleming | |
| 6,376,045 B1 * | 4/2002 | Wong | C09J 7/29 359/538 |
| 8,274,727 B1 * | 9/2012 | Yap | G02B 5/128 359/534 |
| 8,865,293 B2 | 10/2014 | Smithson | |
| 9,471,863 B2 | 10/2016 | Fleming | |
| 2017/0131444 A1 | 5/2017 | Xia et al. | |
| 2017/0293056 A1 | 5/2017 | Xia | |
| 2017/0276844 A1 | 7/2017 | Niwas | |
| 2017/0192142 A1 | 10/2017 | Chen-Ho | |
| 2018/0239981 A1 | 8/2018 | Johnson et al. | |

FOREIGN PATENT DOCUMENTS

| | | |
|---|---|---|
| WO | WO 2018-038160 | 3/2018 |
| WO | WO 2018-054778 | 3/2018 |
| WO | WO 2018-057553 | 3/2018 |
| WO | WO 2018-057555 | 3/2018 |
| WO | WO 2018-057558 | 3/2018 |
| WO | WO 2018-057561 | 3/2018 |
| WO | WO 2018-058406 | 4/2018 |
| WO | WO 2018-151759 | 8/2018 |
| WO | WO 2018-151760 | 8/2018 |
| WO | WO 2018-178802 | 10/2018 |
| WO | WO 2018-236783 | 12/2018 |
| WO | WO 2019-003158 | 1/2019 |
| WO | WO 2019-082162 | 5/2019 |
| WO | WO 2019-084295 | 5/2019 |
| WO | WO 2019-084297 | 5/2019 |
| WO | WO 2019-084299 | 5/2019 |
| WO | WO 2019-084302 | 5/2019 |
| WO | WO 2020-021419 | 1/2020 |
| WO | WO 2020-021458 | 1/2020 |
| WO | WO 2020-021459 | 1/2020 |
| WO | WO 2020-136531 | 7/2020 |
| WO | WO 2020-136567 | 7/2020 |
| WO | WO 2020-217221 | 10/2020 |

* cited by examiner

RETROREFLECTIVE ARTICLE COMPRISING MULTIPLE LOCALLY-LAMINATED LAYERS

BACKGROUND

Retroreflective materials have been developed for a variety of applications. Such materials are often used e.g. as high visibility trim materials in clothing to increase the visibility of the wearer. For example, such materials are often added to garments that are worn by firefighters, rescue personnel, road workers, and the like.

SUMMARY

In broad summary, herein is disclosed a retroreflective article comprising a binder layer and a plurality of retroreflective elements. Each retroreflective element comprises a transparent microsphere partially embedded in the binder layer. At least some of the retroreflective elements comprise a first locally-laminated layer and a second locally-laminated layer. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all non-photographic figures and drawings in this document are not to scale and are chosen for the purpose of illustrating different embodiments of the invention. In particular, the shapes, dimensions and other aspects of the various items in the Figures are depicted in illustrative terms only, and no relationship between the dimensions, shapes, relative curvatures, etc. of the various items should be inferred from the drawings, unless so indicated. (In fact, from the discussions herein it will be appreciated that various layers and other items as depicted in the Figures are idealized, generic representations.)

Figure 1:
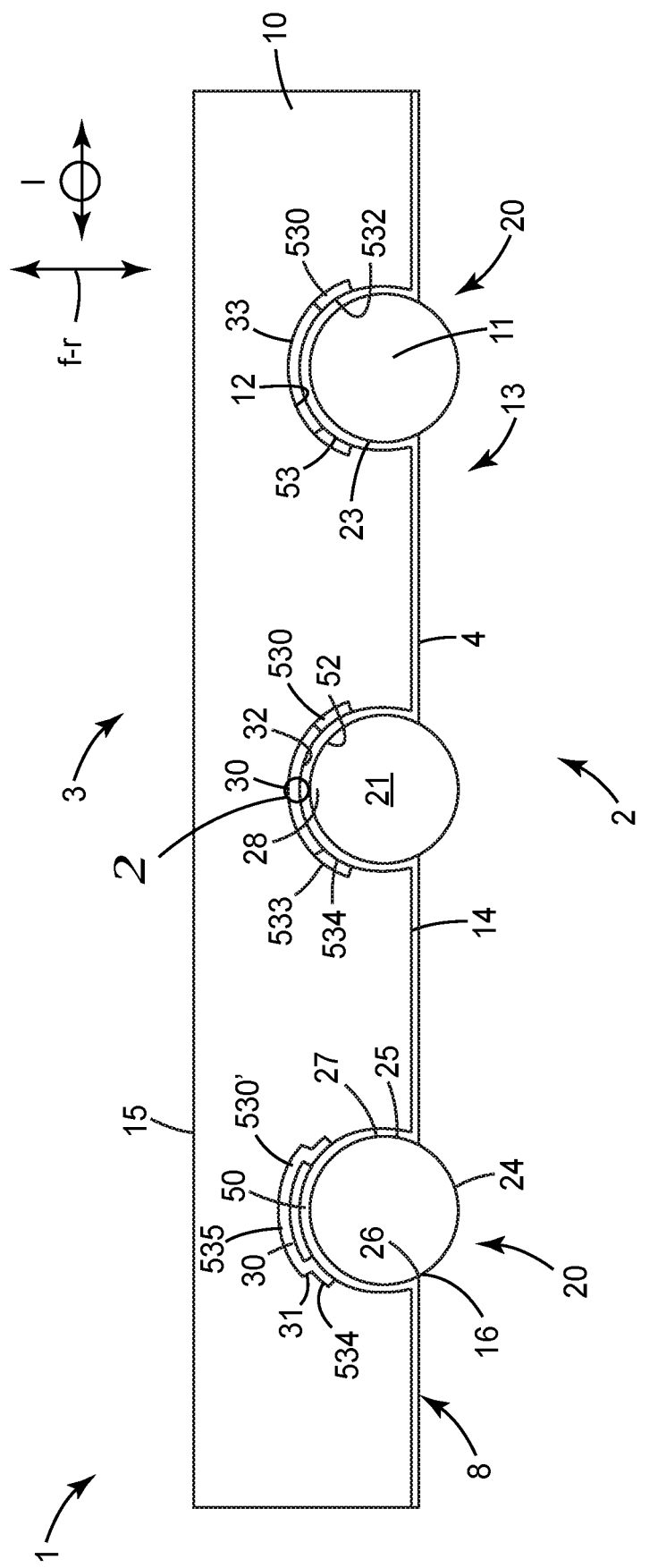
FIG. 1 is a side schematic cross sectional view of an exemplary retroreflective article with first and second exemplary locally-laminated layers.

As used herein, terms such as "front", "forward", and the like, refer to the side from which a retroreflective article is to be viewed (and thus from which light impinges on the article to be retroreflected). Terms such as "rear", "rearward", and the like, refer to an opposing side, e.g. a side that is to be coupled to a garment. The term "lateral" refers to any direction that is perpendicular to the front-rear direction of the article, and includes directions along both the length and the breadth of the article. The front-rear direction (f-r), and exemplary lateral directions (l) of an exemplary article are indicated in FIG. 1.

Terms such as disposed, on, upon, atop, between, behind, adjacent, contact, proximate, and the like, do not require that a first entity (e.g. a layer) must necessarily be in direct contact with a second entity (e.g. a second layer) that the first entity is e.g. disposed on, behind, adjacent, or in contact with. Rather, such terminology is used for convenience of description and allows for the presence of an additional entity (e.g. a layer such as a bonding layer) or entities therebetween, as will be clear from the discussions herein.

By reflective is meant that an entity (e.g. a layer) is able to reflect "light"; in this context, "light" is defined as encompassing the visible spectrum and the infrared spectrum. A reflective layer as defined herein can thus reflect at least at some wavelength of visible light, at least at some wavelength of infrared light, or both. In quantitative terms, a reflective layer (which can comprise multiple sublayers as discussed herein) is a layer of material that, in a spectral reflectance curve obtained at normal incidence, exhibits a reflectance of at least 25 percent (%) at least at a selected wavelength or within a selected range of wavelength between 380 nanometer (nm) and 1 millimeter (mm), between 400 nm and 700 nm (e.g. a typical visible light wavelength range), or between 700 nm and 2500 nm (e.g. a typical near-infrared (IR) light wavelength range). In many embodiments the selected wavelength or range will be a wavelength or range of peak reflection exhibited by the layer. In some embodiments, a reflective layer may exhibit a reflectance of at least 40, 60, 80, or 90 percent at the selected wavelength or within the selected wavelength range. In some embodiments, a reflective layer may exhibit a reflectance of at least 40, 60, 80, or 90 percent, across the entirety of the visible light range, across the entirety of the near-infrared light range, or across both ranges.

By layers that differ in reflectivity is meant that the layers exhibit a difference in reflectance of at least 10 percent at any selected wavelength, or within any selected range of wavelength, between 380 nm and 1 mm, between 400 nm and 700 nm, or between 700 nm and 2500 nm, as discussed in detail later herein.

By transparent is meant that an entity (e.g. a layer) transmits at least 50 percent of light at a selected wavelength or within a selected range of wavelength between 380 nm and 1 mm, between 400 nm and 700 nm, or between 700 nm and 2500 nm. In some embodiments the transparent entity may transmit at least 60, 70, 80 or 90 percent of light at the selected wavelength or within the selected wavelength range. In some embodiments the transparent entity may transmit at least 60, 70, 80, or 90 percent of light across the entirety of the visible light range, the entirety of the near-infrared light range, or across both ranges. In some embodiments, the transparent entity may transmit at least 50 percent of light in the visible light spectrum and reflect at least 25 percent of light in the near-IR light spectrum. In some embodiments, the transparent entity may transmit at least 50 percent of light in the near-IR light spectrum and reflect at least 25 percent of light in the visible light spectrum. (It will thus be appreciated that some layers, e.g. certain wavelength-selective-reflecting dielectric stacks, may qualify as both a reflective layer and a transparent layer as defined herein.)

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). For angular orientations, the term "generally" means within clockwise or counterclockwise 10 degrees. The term "substantially", unless otherwise specifically defined, means to a high degree of approximation (e.g., within +/−10% for quantifiable properties). For angular orientations, the term "substantially" means within clockwise or counterclockwise 5 degrees. The term "essentially" means to a very high degree of approximation (e.g., within plus or minus 2% for quantifiable properties; within plus or minus 2 degrees for angular orientations); it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. The term "configured to" and like terms is at least as restrictive as the term "adapted to", and requires actual design intention to perform the specified function rather than mere physical capability of performing such a function. All references herein to numerical parameters (dimensions, ratios, and so on) are understood to be calculable (unless otherwise noted) by the use of average values derived from a number of measurements of the parameter. All averages referred to herein are number-average unless otherwise specified.

DETAILED DESCRIPTION

FIG. 1 illustrates a retroreflective article 1 in exemplary embodiment. As shown in FIG. 1, article 1 comprises a binder layer 10 that comprises a plurality of retroreflective elements 20 spaced over the length and breadth of a front side of binder layer 10. Each retroreflective element comprises a transparent microsphere 21 that is partially embedded in binder layer 10 so that the microspheres 21 are partially exposed and define a front (viewing) side 2 of the article. The transparent microspheres thus each have an embedded (surface) area 25 that is seated in a receiving cavity 11 of binder layer 10, and an exposed area 24 that is exposed forwardly of major front surface 14 of binder layer 10. In some embodiments, the exposed areas 24 of microspheres 21 of article 1 are exposed to an ambient atmosphere (e.g., air) in the final article as-used, rather than being e.g. covered with any kind of cover layer or the like. Such an article will be termed an exposed-lens retroreflective article. In various embodiments, a microsphere may be partially embedded in the binder layer so that on average, from 15, 20 or 30 percent of the diameter of the microsphere, to about 80, 70, 60 or 50 percent of the diameter of the microsphere, is embedded within binder layer 10. In many embodiments, a microsphere may be partially embedded in the binder layer so that, on average, from 50 percent to 80 percent of the diameter of the microsphere is embedded within binder layer 10.

A retroreflective element 20 will comprise at least one reflective layer disposed rearward of transparent microsphere 21, e.g. between the transparent microsphere 21 and the binder layer 10. The microsphere 21 and the reflective layer(s) collectively return a substantial quantity of incident light towards a source of light that impinges on front side 2 of article 1. That is, at least some of the light that strikes the retroreflective article's front side 2 passes into and through a microsphere 21 and is reflected by at least one reflective layer to again reenter the microsphere 21 such that the light is steered to return toward the light source. In many embodiments two reflective layers may be present; in some embodiments, one or both such layers may take the form of a locally-laminated layer, as discussed in detail herein.

A retroreflective article 1 as disclosed herein will include at least some retroreflective elements 20 that each comprise a transparent microsphere 21 bearing a first locally-laminated layer 30 and a second locally-laminated layer 530, as shown in exemplary embodiment in FIG. 1. In many embodiments, the first locally-laminated layer 30 and/or the second locally-laminated layer 530 may be reflective layers, as discussed later herein in detail. However, in some embodiments at least one of the first and second locally-laminated layers may not be reflective. Rather, in some embodiments a laminated layer may serve some other function. For example, such a layer may provide a release surface to prevent some other layer from being bonded to an area of a microsphere that is covered by the release layer, as discussed later herein. In such embodiments, some other layer may be provided to serve as a reflective layer, e.g. a layer formed by conventional vapor coating of a metal layer or a dielectric stack on the transparent microsphere, by printing a reflective layer on the microspheres, and so on. In some embodiments a reflective layer may be provided in the form of a secondary reflective layer as achieved by including reflective particles in a binder layer of the retroreflective article, as discussed later herein.

Given the fact that a locally-laminated layer may not necessarily serve only (or at all) as a reflective layer, such a layer will be referred to herein as a "functional" layer, with the understanding that in many embodiments the function of such a layer will be to serve as a reflective layer. By a locally-laminated layer is meant a functional layer that is pre-made as an article (e.g. as part of a film-like or sheet-like structure) after which a local area of the pre-made layer is physically transferred (i.e. laminated) to a portion of a transparent microsphere, as discussed in detail later herein. By first and second locally-laminated layers is meant that first layers are disposed onto at least some microspheres in a first lamination process, after which second layers are disposed onto at least some of the same microspheres in a second, subsequent lamination process. That is, in this instance the terms first and second specifically implies sequential lamination processes. Performing of two sequential lamination processes, along with appropriate control of the lamination processes as disclosed herein, can give rise to first and second locally-laminated layers that can be identified as such by any of various geometric, structural, optical or other properties, as discussed in detail herein.

Exemplary first locally-laminated layers 30 and second locally-laminated layers 530 are depicted in generic, idealized fashion in FIG. 1. As shown in exemplary embodiment in FIG. 1, in some embodiments at least a portion 534 of a second locally-laminated layer 530 may be positioned "in parallel" to a first locally-laminated layer 30. The term in parallel signifies a portion of a second layer 530 (e.g. portions 534 in FIG. 1) that can be reached by light rays that impinge on the retroreflective element from the front, without those light rays having to pass through any portion of the first layer 30. In some embodiments the entirety of a second layer 530 may be made up of portions 534 that are in parallel to a first layer 30; in other embodiments only a portion of a second layer may be in parallel to a first layer, as will be made clear by the discussions below.

In some embodiments at least a portion 535 of a second locally-laminated layer 530 may be positioned "in series" with a first locally-laminated layer 30. The term in series signifies a portion of a second layer 530 (e.g. portion 535 of the particular second layer denoted 530' in FIG. 1) that is positioned generally rearward of a first layer 30, so that light rays that impinge on the retroreflective element from the front have to pass through the first layer 30 to reach the "in-series" portion 535 of the second layer 530.

Thus in at least some embodiments, for at least some of the retroreflective elements 20 that comprise first and second locally-laminated layers 30 and 530, a first area of the embedded area 25 of the transparent microsphere that is covered by first layer 30, and a second area of the embedded area 25 of the microsphere that is covered by second layer 530, will be non-coextensive. By this is meant that the second area that is occupied by second layer 530, does not share the exact same size and shape as the first area that is occupied by first layer 30.

Figure 4:
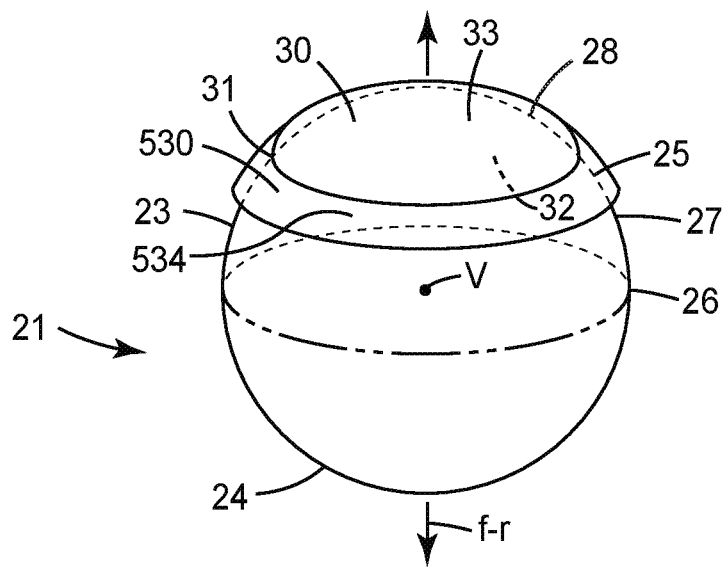
FIG. 4 is an isolated magnified perspective view of a single transparent microsphere and first and second exemplary locally-laminated layers.
Figure 5:
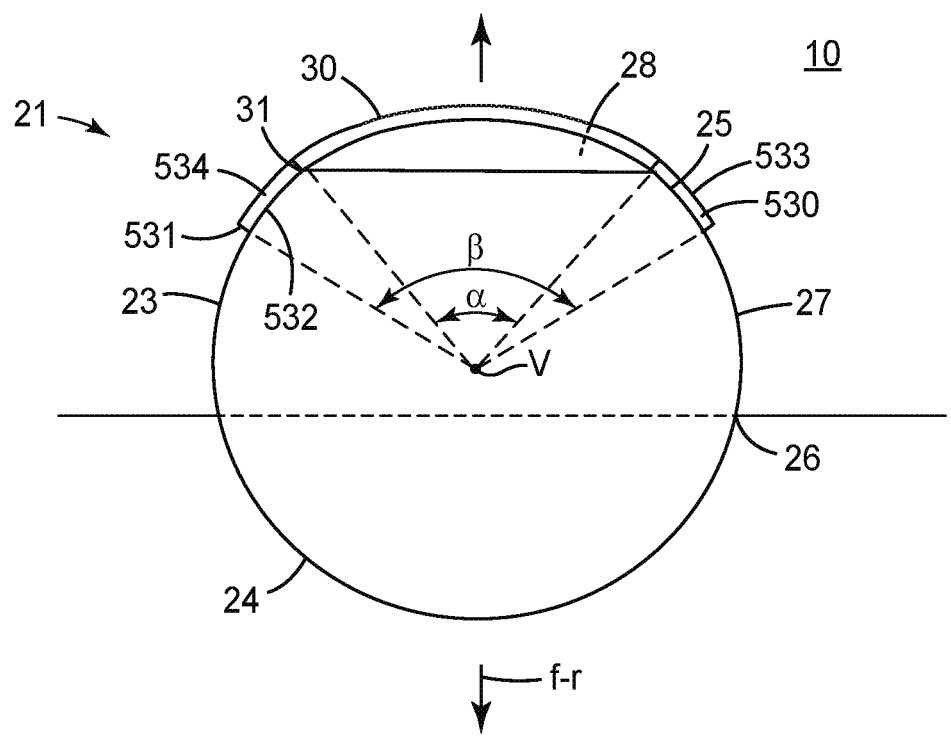
FIG. 5 is an isolated magnified side schematic cross sectional view of a single transparent microsphere and first and second exemplary locally-laminated layers.

In some instances no portion of a second locally-laminated layer 530 may be positioned in series with a first locally-laminated layer. In other words, for some retroreflective elements 20 a portion 535 as shown for second locally-laminated layer 530' in FIG. 1, may not be present. For example, in some embodiments a second locally-laminated layer 530 may be provided as a partial, or complete, spherical segment (e.g. segments 534 of FIGS. 1, 4 and 5) that at least partially circumscribes a first locally-laminated layer 30 e.g. in the general manner of second layers 530 as shown in FIGS. 4 and 5, without any significant portion of second layer 530 being positioned rearward of (in series with) any portion of first layer 30. In other embodiments a significant portion 535 of second layer 530 may be positioned rearward of (in series with) a first layer 30, in the general manner of portion 535 of the particular second layer denoted 530' of FIG. 1. In at least some such cases, a second layer 530 that comprises an in-series portion 535 may also include a significant portion 534 that is in parallel to the first layer 30, as evident from FIG. 1.

Thus in summary, in some instances a second layer 530 may be locally laminated so that it is present only as a spherical segment that at least partially circumscribes the first locally-laminated layer but does not rearwardly overlap the first layer to any significant extent. Such an instance is depicted in exemplary, generic representation for the particular second layers labeled 530 in FIGS. 1, 4 and 5. In other instances a second layer may be locally laminated so that a portion 535 of it rearwardly overlaps the first layer, as depicted in exemplary, generic representation for the particular second layer labeled 530' in FIG. 1.

Whether or not a second locally-laminated layer 530 includes a portion 535 that is in series with a first locally-laminated layer 30, in many embodiments the second layer 530 will comprise a portion 534 that is in parallel to the first layer 30, and that forms an at least partial spherical segment that at least partially circumscribes the first layer. Such an arrangement is depicted in exemplary, generic representation in the magnified, isolated views of FIGS. 4 and 5. In the particular arrangements of FIGS. 4 and 5, portion 534 of second layer 530 is a complete spherical segment rather than a partial spherical segment; that is, portion 534 completely circumscribes first layer 30. In other embodiments a second layer 530 may comprise an in-parallel portion 534 that only partially circumscribes a first layer 30. A second layer portion 534 that is a complete spherical segment will resemble a complete, uninterrupted annulus when viewed along the front-rear axis of the transparent microsphere; a second layer portion 534 that is a partial spherical segment will resemble a partial annulus when viewed in this manner. It will be understood that the term spherical segment is used for convenience to denote a second layer that generally circumscribes a first layer when viewed in this manner; it does not imply that the spherical segment must necessarily take the form of a perfect annulus nor does it imply that a radially-outer perimeter or a radially-inner perimeter of such a segment need take the shape of a perfect circle.

An arrangement in which a second layer 530 comprises an in-parallel portion 534 may be achieved by two general methods. In one such method, a second layer is locally laminated so that the second layer includes a portion 535 that remains in place rearward of the first layer (i.e. in the general manner of second layer 530' of FIG. 1). Such a second lamination process (discussed later herein) will be referred to herein as a full-transfer process. Such methods will produce a second layer 530 with at least a portion 535 whose forward surface 532 is in contact with a rearward surface 33 of first layer 30. The second layer may also have another portion 534 whose forward surface 532 is in contact with a rearward surface of the transparent microsphere or with a rearward surface 53 of a bonding/intervening layer 50 that may be present on the transparent microsphere.

In another such method, a second layer is locally laminated so that the second layer does not include a portion that remains in place rearward of the first layer (i.e., in the general manner of second layers 530 as shown in FIGS. 4 and 5). Such a second lamination process (also discussed later herein) will be referred to herein as an annular-transfer process. In any real-life lamination process, of course, a mixture of these two arrangements may result. That is, from the discussions later herein regarding methods of forming first and second locally-laminated layers, it will be evident that the particular shapes, coverages of microspheres, and so on, of the first and second layers may vary somewhat due to the statistical nature of the lamination process. However, the discussions herein will also make it clear that the lamination parameters and conditions can be varied to tailor the average condition of the first layers, and the second layers, to desired ranges.

Various parameters and lamination process conditions may be chosen so as to affect, e.g. govern, the locations of a transparent microsphere that are occupied by a first locally-laminated layer 30 and a second locally-laminated layer 530, the relative sizes of the first and second layers, and so on. Such arrangements may be discussed with respect to the exemplary arrangements depicted in idealized, generic representation in FIGS. 4 and 5, and may be characterized e.g. by way of an angular arc occupied by each layer.

In various embodiments, a first layer 30 may occupy an angular arc α (measured from minor outer edges 31 of layer 30, from a vertex "V" at the geometric center of the microsphere, as indicated in FIG. 5) that is e.g. no more than 135, 90, 70, 50, 30, 20, or 10 degrees. In further embodiments, the first layer 30 may occupy an angular arc α that is at least 5, 15, 25, 35, 45, 55, 65 or 80 degrees. By way of a specific example, the first layer 30 shown in FIG. 5 occupies an angular arc α of approximately 80-85 degrees. In some embodiments, such a first layer 30 may be at least generally, substantially or essentially centered on the front-rear centerline of the transparent microsphere (i.e., centered on the rearwardmost point or "north pole" of the microsphere, as in the exemplary arrangements of FIGS. 4 and 5).

A second layer 530 may then comprise a portion 534 that is in parallel to the first layer 30, which portion is e.g. in the form of a spherical segment that is positioned radially outward of the first layer 30 and at least partially circumscribes the first layer. The second layer may occupy an angular arc β that is e.g. more than 10, 20, 30, 50, 60, 70, 90, 110, 130, 150, or 170 degrees. Such an angular arc is measured from the perimeter of the second layer (i.e. from minor outer edges 531 of layer 530) and disregards whether or not the second layer includes only the spherical segment portion 534 or also includes an in-series portion 535 that overlaps the first layer. By way of a specific example, the second layer 530 shown in FIG. 5 occupies an angular arc β of approximately 125-135 degrees. In some embodiments, such a second layer 530 will be at least generally, substantially or essentially centered on the rearwardmost point of the transparent microsphere, in similar manner to the first layer 30.

Methods of evaluating angular arcs (as well as other, related parameters such as percent area coverage exhibited by the layers) are presented in detail in U.S. Provisional Patent Application 62/739,506 and in PCT International Patent Application No. US2018/057553, both of which are incorporated by reference in their entirety herein. Such methods are also discussed in U.S. Provisional Patent Application 62/739,489 and in PCT International Patent Application No. US2018/057561, both of which are incorporated by reference in their entirety herein. It will be appreciated that such parameters may be at least semi-quantitatively ascertained by use of photomicrographs of the general type found e.g. in the '489 and '561 applications.

In some particularly useful embodiments, a first layer 30 may be present in a relatively small area in comparison to the area occupied by the second layer 530, and may be located at or near the rearwardmost point of a transparent microsphere in the manner noted above. In particular embodiments, the first layer may be coincident with the front-rear centerline of the transparent microsphere (meaning that the centerline passes through some portion of the first layer), as in the exemplary embodiments of FIGS. 1, 4 and 5. For convenience, such a first layer will be occasionally referred to herein by the shorthand of a "polar-cap" layer. Such a polar-cap first layer can be partially, e.g. completely, circumscribed by a second layer (e.g., the second layer can occupy an angular arc that is greater than that of the first layer). Such arrangements can impart particular advantages as discussed in detail herein. In some particular embodiments a polar-cap first layer may occupy an angular arc of no more than 40 degrees and a second layer may comprise an in-parallel segment that occupies an angular arc of at least 80 degrees. In other particular embodiments, a polar-cap first layer may occupy an angular arc of at least 80 degrees with the second layer comprising an in-parallel segment that occupies an angular arc that is greater than 90 degrees.

In some particular embodiments, a first locally-laminated layer 30 and a second locally-laminated layer 530 may, on average, occupy at least generally, substantially, or essentially the same angular arcs. For example, in some embodiments first and second layers (which may be identical to each other in all aspects, or may differ from each other in at least one aspect) may be locally laminated so that both of the layers occupy generally, substantially, or essentially the same area of the transparent microsphere. It will be understood that in any actual production process statistical variations may occur even for first and second layers that are targeted to the same nominal area coverage and/or angular arcs.

In many embodiments, either or both of the first locally-laminated layers 30, and the second locally-laminated layers 530, may be a reflective layer as defined herein. In various embodiments, any such reflective layer may exhibit a reflectance of at least 40, 60, 80, or 90 percent at least at some wavelength between 380 nm and 2500 nm. In some embodiments, first and second layers 30 and 530 may be at least generally, substantially, or essentially identical to each other in their reflective character. For example, they may both be a vapor-deposited silver layer, they may both be a dielectric stack comprising substantially identical sets of sublayers, and so on. In such cases, the performing of two successive lamination operations may serve to, for example, enhance the overall uniformity of the resulting retroreflective article, to produce a retroreflective article that exhibits enhanced retroreflectivity at larger entrance angles, and so on.

However, in many useful embodiments first and second layers 30 and 530 may differ in their reflective character. For example, in some embodiments second layer 530 may be at last generally reflective, while first layer 30 may be non-reflective, e.g. transparent as defined earlier herein. If a first, non-reflective layer 30 is present in a polar-cap configuration as described above, and is circumscribed on at least some sides by portions 534 of a second, reflective layer 530, a retroreflective element may be produced with unique properties. For example, a retroreflective element (and a retroreflective article comprising a collection of such elements) comprising a visibly-transparent first layer 30 in polar-cap configuration and a visibly-reflective second layer 530 in spherical segment configuration may exhibit visible-light retroreflectivity that, at least at some wavelengths, actually increases with increasing (i.e. more glancing) entrance angles of incident light.

Thus in some embodiments, a first locally-laminated layer 30 may serve primarily to passivate a polar-cap region of a transparent microsphere so that a second locally-laminated, reflective layer will not bond to the polar-cap region. This may allow production of a retroreflective element having a second, reflective layer that is a purely spherical segment (rather than including a portion that is in series to the transparent, polar-cap first layer) and having a non-reflective, e.g. transparent, polar-cap region. (As discussed later herein, the lamination conditions can also be manipulated to promote, or to disfavor, such an occurrence.) In various embodiments, such a first layer 30 may exhibit a total transmittance of at least 85, 90, or 95 percent from 380 nm to 2500 nm.

In some embodiments, a first locally-laminated layer 30 and a second locally-laminated layer 530 may differ in reflectance. As defined above, this means that the layers exhibit a difference in reflectance of at least 10 percent at any selected wavelength or within any selected range of wavelength between 380 nm and 1 mm, between 400 nm and 700 nm, or between 700 nm and 2500 nm. In various embodiments, first and second layers may exhibit a difference in reflectance of at least 20, 40, 60, 80, or 90 percent at a selected wavelength or within a selected range of wavelength between 380 nm and 1 mm, between 400 nm and 700 nm, or between 700 nm and 2500 nm. The percentage difference is in absolute terms and is evaluated at the wavelength of maximum difference in reflectance. Often, the greatest percentage difference in reflection may occur at a wavelength of peak reflection of one of the layers. By way of a specific example, if one layer exhibits a reflectance of 70 percent at some wavelength (e.g. a wavelength of peak reflection) and the other layer exhibits a reflectance of 40 percent at that same wavelength, the layers differ in reflectance by 30 percent.

For these and any other evaluations presented herein requiring measurement of reflectance, it is stipulated that even if the layers, as present on the microspheres, are e.g. too small to permit a direct measurement of their in situ reflectance in a retroreflective article, these definitions will be applied to measurement of layers of these same materials in a format that allows their reflectance to be evaluated. Of course, for many such layers it may be possible to obtain a reliable estimate of the reflectance from retroreflectance measurements of a retroreflective article bearing the layers.

In some embodiments both first locally-laminated layer 30 and second locally-laminated layer 530 may be reflective, but may differ at least somewhat in their reflective character. In some embodiments, at least one of the reflective layers may be wavelength-selective; i.e., a layer that preferentially reflects light at a particular, e.g. predetermined, wavelength as defined and described below. In some such embodiments, one of the reflective layers (e.g. second layer 530) may be wavelength-selective with the other reflective layer (e.g. first layer 30) being non-wavelength-selective. A non-wavelength-selective reflective layer is any reflective layer that does not qualify as a wavelength-selective layer as defined herein. In many embodiments, a non-wavelength-selective layer may be a broad-spectrum, highly-reflective layer comprised of e.g. a layer of silver or aluminum. In other embodiments, both the first and second layers may be wavelength-selective reflective layers.

By way of a specific example, a first layer 30 (disposed e.g. in a polar-cap arrangement) may be a wavelength-selective reflective layer that is configured to preferentially reflect light that is somewhere within the near-infrared (IR) spectrum (e.g. encompassing a wavelength of approximately 700-2500 nm) light. Meanwhile, a second layer 530 (disposed e.g. in a spherical segment) may be a wavelength-selective reflective layer that is configured to preferentially reflect light that is somewhere within the visible spectrum (e.g. encompassing a wavelength of approximately 400-700 nm). A retroreflective article may thus be produced that, at relatively low (e.g. head-on) entrance angles of e.g. 0 to 5 degrees, preferentially reflects near-IR light; and, that at relative larger entrance angles (e.g. 30 degrees), preferentially reflects visible light. One arrangement that achieves this general type of behavior is demonstrated in Working Example 1 of the Working Examples herein. In other embodiments, the wavelength-selectivities of the first and second layers can be switched to produce a retroreflective article that preferentially reflects visible light at low entrance angles and preferentially reflects near-IR light at high entrance angles. And, of course, arrangements may be provided in which first and second layers preferentially reflect at different wavelengths within the visible light range or in which they preferentially reflect at different wavelengths within the infrared light range.

By preferentially reflect is meant that at a particular wavelength within the range of 380 nm to 1 mm, the layer exhibits a peak reflectance that is greater than a reflectance exhibited at some other wavelength within this range, by at least 20 percent, with the difference expressed in absolute terms. By way of a specific example, a wavelength-selective reflective layer that exhibits a peak reflectance of 80 percent at 600 nm and exhibits a reflectance of 20 percent at 900 nm, exhibits a peak reflectance that is greater than the 900-nm reflectance by 60 percent. In various embodiments a wavelength-selective reflective layer may exhibit a peak reflectance that is greater than a reflectance exhibited at some other wavelength by at least 30, 40, 50, 60, 70, 80 or 90 percent.

In various embodiments, first and second layers 30 and 530 can be configured to exhibit a peak reflection at wavelengths that differ from each other by a desired amount. As alluded to above, in some embodiments one layer may preferentially provide reflection in the visible range, while the other layer may preferentially provide reflection in the near-IR range. Or, in some embodiments one layer may preferentially provide reflection in one portion of the visible range, while the other layer may preferentially provide reflection in another, different portion of the visible range. In some embodiments, one or both layers may serve e.g. as a bandpass filter, a notch filter or the like. In various embodiments, the first and second layers may be chosen to exhibit respective wavelengths of peak reflection that differ by at least 50, 100, 200, 400, or 600 nm. In further embodiments, the first and second layers may be chosen to exhibit respective wavelengths of peak reflection that differ by no more than 10000, 5000, 2000, 1000, 800, 700, 500, or 300 nm.

In some embodiments, such a retroreflective element (and a retroreflective article comprising a collection of such elements) may exhibit retroreflectivity that, at least at some wavelengths, does not drop off as drastically with increasing entrance angles of incident light, as for conventional retroreflective articles. In fact, such elements and articles may exhibit retroreflectivity that, at least at some wavelengths, is actually greater at high entrance angles (e.g. measured at a 30 degree entrance angle of light) than at low, more "head-on" entrance angles (e.g. measured at a 5 degree entrance angle). Such arrangements are in contrast with conventional retroreflective articles and offer the possibility of many intriguing uses. One such arrangement that achieves this type of behavior is demonstrated in Working Example 1 of the Working Examples herein.

The above discussions have made it clear that the first and second layers can be any suitable layer with any desired configuration, property or function. For example, in some embodiments a first or second layer may be, or comprise, an optical retarder, meaning a layer (or sublayer) that selectively slows one of the orthogonal components of light to change its polarization. In some embodiments, such an optical retarder may be configured as a quarter-wave retarder that, for a certain wavelength of interest has a retardance of $\lambda/4$. A quarter-wave retarder for a given wavelength of light will change the light of that wavelength from circularly polarized light to linear polarized light or vice versa. Optical retarders are described and discussed in detail in U.S. Provisional Patent Application 62/610,180 and in PCT International Patent Application No. IB2018/058406, both of which are incorporated by reference in their entirety herein.

In some embodiments a first and/or second locally-laminated layer may comprise a colorant so as to be a color layer of the general type described in detail later herein. In general, the first and second locally-laminated layers may comprise any desired type, composition and number of (sub)layers, formed in any desired order or configuration, for any purpose. It is not necessarily required that any such sublayer serve an optical purpose (although in some instances it may be necessary that the sublayer not detract from the optical functioning of some other layer). In various embodiments, a sublayer might be an embrittlement layer, an adhesion-promoting (or adhesion-minimizing, i.e. passivating) layer, a color layer, or an optical retarding layer, as discussed herein. A first and/or second locally-laminated layer may include any desired combination of any such sublayers (e.g. in combination with a reflecting layer). Although in many embodiments the first and second locally-laminated layers may differ in at least one aspect (e.g. in composition, number and/or type of sublayers, thickness, and/or in any optical property such as reflectivity, absorption, or transparency), in some embodiments the first and second locally-laminated layers may be identical to each other.

It will be appreciated that the reflectivity of the first and second layers can be configured in a wide variety of manners. For example, the above-recited general arrangement could be reversed, to provide a polar-cap first layer that preferentially reflects visible light and a spherical segment that preferentially reflects near-IR light. In more specific examples, a first or a second layer can be e.g. a metal layer (e.g. a vapor-coated layer of silver, aluminum, etc.) that exhibits substantially non-preferential reflection (i.e. that does not vary greatly with wavelength). The other layer could then be a dielectric stack (e.g. comprising alternating sublayers of a high-refractive-index material such as a metal oxide and a low-refractive-index organic polymeric material) that selectively exhibits a wavelength of peak (maximum) reflection in a desired range. Or, a first layer could be a first dielectric stack in which the high and low refractive index sublayers are arranged so that the first layer selectively exhibits a wavelength of peak reflection in a first range with the second layer being a second dielectric stack in which the high and low refractive index sublayers are arranged so that the second layer selectively exhibits a wavelength of peak reflection in a second range that is different from the first range.

Dielectric stacks of alternating high and low refractive index sublayers can be tailored in many and varied configurations to provide a desired selectivity of reflection. All such possible arrangements will not be discussed herein, but will be well known and available to ordinary artisans. Various exemplary arrangements are provided, for example, in U.S. Pat. Nos. 3,700,305 and 6,172,810, which are incorporated by reference in their entirety herein. Specific exemplary arrangements (e.g. a dielectric stack of total thickness in the range of 260-270 nm and with a wavelength of peak reflectivity in the range of 550-600 nm; and, a dielectric stack of total thickness in the range of 780-790 nm and with a wavelength of peak reflectivity in the range of approximately 850-950 nm) are disclosed in the Working Examples herein.

In various embodiments, first and second locally-laminated layers can be configured to exhibit a peak reflection at wavelengths that differ from each other by a desired amount. As alluded to above, in some embodiments one locally-laminated layer may preferentially provide reflection in the visible range, while the other locally-laminated layer may preferentially provide reflection in the near-IR range. Or, in some embodiments one layer may preferentially provide reflection in one portion of the visible range, while the other layer may preferentially provide reflection in another, different portion of the visible range. In some embodiments, one or both layers may serve e.g. as a bandpass filter, a notch filter or the like. In various embodiments, the first and second locally-laminated layers may be chosen e.g. to exhibit respective wavelengths of peak reflection that differ by at least 50, 100, 200, 400, or 600 nm. In further embodiments, the first and second layers may be chosen to exhibit respective wavelengths of peak reflection that differ by no more than 1000, 800, 700, 500, or 300 nm.

In some embodiments, the first and second locally-laminated layers may be configured so that at least at one wavelength between 400 nm and 1400 nm, the retroreflective article exhibits a percent retroreflectance at a 30 degree entrance angle that is greater than a percent reflectance exhibited at a 5 degree entrance angle, by an increment at least 1, 2, 3, 4 or 5 percent. In further embodiments, such performance may occur at least at one wavelength between 400 nm and 750 nm. In such measurements, the percent-greater increment is in terms of the absolute difference in the retroreflectance values rather than the difference being ratioed to one of the values. For example, an article that exhibits a percent retroreflectance of 5 percent at a 30 degree entrance angle and a percent retroreflectance of 2 percent at a 5 degree entrance angle, will be understood to exhibit a 30 degree retroreflectance that is greater than a 5 degree retroreflectance, by an increment of 3 percent (not 150 percent).

It will thus be appreciated that the herein-disclosed ability to dispose first and second locally-laminated layers in various geometric configurations (e.g. comprising "polar-cap" first layers that occupy chosen areas of microspheres, and "spherical-segment" second layers that at least partially encircle the polar-cap first layers); and, the ability to choose the reflectivity of the first and second layers, provides tools that allow the production of retroreflective articles of a wide variety of characteristics, retroreflective performance, and so on.

By way of one specific, non-limiting example, a retroreflective article may be produced with polar-cap first-layer reflectors (occupying, on average, an angular arc of e.g. from 40 degrees up to 90 degrees) that are highly reflective (e.g., comprised of vapor-coated silver) at all relevant wavelengths. The article may have spherical-segment second-layer reflectors that are dielectric stacks chosen to exhibit reasonably good reflectivity at some visible-light wavelengths but that also are transparent (and, specifically, non-absorptive) to at least some wavelengths of visible light. In such an example, the second-layer reflectors may be present as a spherical segment extending from an inner border located approximately at the outer perimeter of the first-layer reflectors, and occupying, on average, an angular arc that is at least 2, 5, 10, 20, 30, 40, 50, or 60 degrees larger than that of the first-layer reflectors.

An article of this general type may display very good retroreflectivity to "head-on" visible light owing to the high reflectivity, at all visible-light wavelengths, of the first, polar-cap layers. The dielectric-stack second layers may provide sufficient visible-light retroreflectivity at off-angles (e.g. at an entrance angle up to 40 degrees) to, in combination with the "head-on" performance, allow the retroreflective article to meet any of various performance standards (e.g. a "32-angle" retroreflectivity standard in which retroreflectivity is measured at various entrance and observation angles, as will be familiar to artisans in the field). At the same time, the dielectric-stack second layers may be sufficiently transparent to allow the color of a binder layer of the retroreflective article (described later herein) to be visible, through the microspheres, in ambient light. In other words, the arrangements disclosed herein may allow the production of a retroreflective article that can pass any of various retroreflectivity performance tests while still allowing the native color of the article (e.g., fluorescent yellow, as imparted by a colorant in the binder layer) to be visible in ambient light. One such arrangement that achieves this general type of behavior is demonstrated in Working Example 2 of the Working Examples herein.

Ordinary artisans will thus appreciate that the arrangements disclosed herein can, in some embodiments, allow a highly reflective layer (such as e.g. silver) to be present only in a relatively low-area (e.g. polar-cap) configuration, so that this layer provides excellent head-on retroreflection while not imparting an overall grey or "washed-out" color in ambient light, as typically happens when such reflective layers are present over a large percentage of the areas of the transparent microspheres. A spherical segment second reflective layer (comprised e.g. of a dielectric stack) can then be included to at least partially compensate for the absence of the highly reflective layer at high entrance angles. Thus, enhanced color fidelity or vividness in ambient light can be provided, while also achieving excellent retroreflective performance. It will thus be appreciated that the arrangements disclosed herein allow designers of retroreflective articles to operate in a design space in which the retroreflective performance, and the color/appearance in ambient light, of the article can both be manipulated. It is however emphasized that the above discussions and specific configurations are only exemplary and that the general arrangements disclosed herein may allow many useful articles to be made (e.g. for purposes of machine vision and the like) that do not necessarily require, or provide, for example, enhanced color fidelity. Arrangements, structures and articles that can be made by the approaches disclosed herein, and potential advantages thereof, are discussed in U.S. Provisional Patent Application No. 62/838,580, which is incorporated by reference in its entirety herein.

The following discussions are couched in terms of a single layer (e.g. a single reflective layer 30) but will be understood to be applicable to the local lamination of both a first layer, and a second layer, as disclosed herein.

In some embodiments a locally-laminated layer will be derived from a multilayer "transfer stack" that includes one or more additional layers in addition to the functional (e.g. reflective) layer. The additional layer(s) can facilitate the transfer of the functional layer to the transparent microsphere as discussed in detail later herein. In various embodiments, some such additional layers may remain as part of the resulting retroreflective article (and may thus be referred to as sublayers of a locally-transferred layer) and some may be sacrificial layers that do not remain as part of the resulting retroreflective article. For example, in some embodiments, a locally-laminated reflective layer 30 may be a multi-layer structure that comprises a reflecting layer 301 along with additional (sub)layers such as e.g. an embrittlement layer 302 and/or a selective-bonding layer 303, as shown in exemplary embodiment in FIGS. 2 and 3. Such additional layers and their reasons for use are described in detail later herein.

Thus according to the terminology used herein, a "reflective" layer 30 includes a reflecting layer 301 and can include other layers (e.g. transparent layers) such as an embrittlement layer 302 and/or a selective-bonding layer 303. The term "reflecting layer" denotes the specific layer 301 (e.g. a metal layer) of a reflective layer 30 that performs the actual reflecting of light (noting that in some embodiments layer 301 itself may comprise sublayers, e.g. in the case that a reflecting layer 301 is a dielectric stack).

Figure 2:
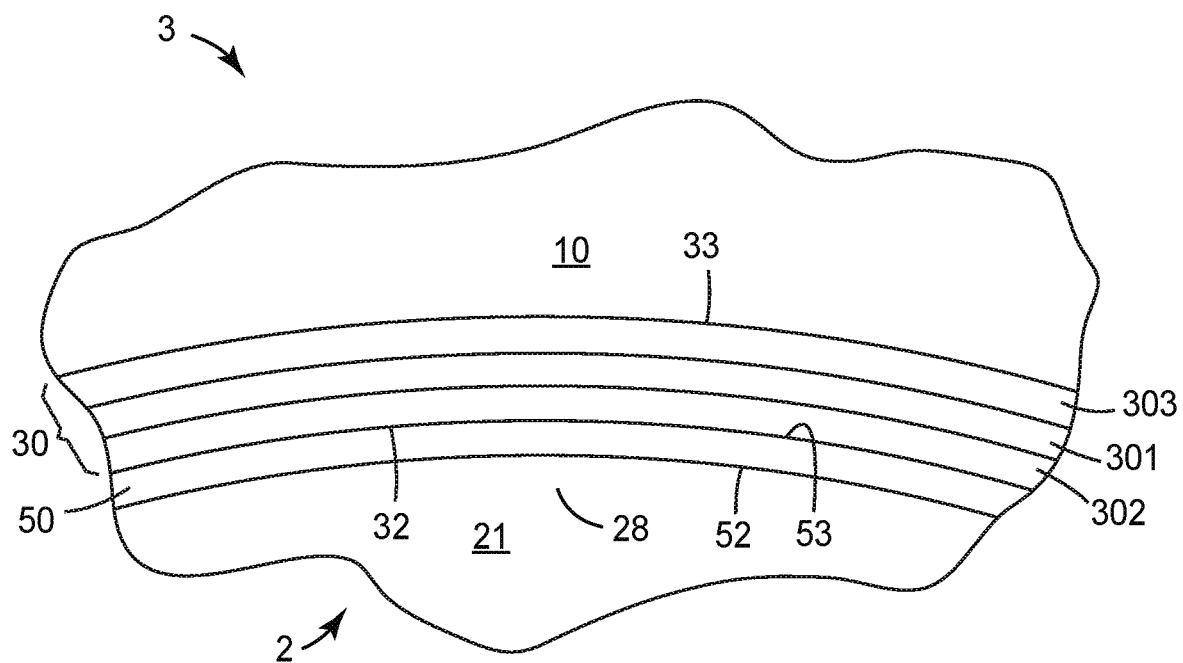
FIG. 2 is a magnified cross sectional view of a portion of FIG. 1, showing details of an exemplary locally-laminated layer.

In embodiments of the type shown in FIG. 2, a reflective layer 30 may comprise a selective-bonding layer 303 that is rearward of reflecting layer 301 (so that a rearward major surface of selective-bonding layer 303 provides rear surface 33 of reflective layer 30); and, it may comprise an embrittlement layer 302 that is forward of reflecting layer 301 (so that a forward major surface of embrittlement layer 302 provides forward surface 32 of reflective layer 30). In embodiments of the type shown in FIG. 3, these arrangements may be reversed, with selective-bonding layer 303 being forward of reflecting layer 301 and with embrittlement layer 302 being rearward of reflecting layer 301. Any such additional layer (or layers) present in the retroreflective light pathway (e.g. layer 302 in FIG. 2, and layer 303 in FIG. 3) will be configured so as to not unduly interfere with the passage of light therethrough. For example, such a layer may be transparent.

The term "laminated" denotes an arrangement achieved by obtaining a functional (e.g. reflective) layer as a pre-made entity (e.g. a macroscopic, reflective, sheet-like or film-like item) and then physically transferring (laminating) local areas of the pre-made functional layer to protruding areas 25 of carrier-borne microspheres 21. A laminated reflective layer, for example, is thus distinguished from a reflective layer obtained by depositing a precursor onto a transparent microsphere (e.g. by printing a silver ink) and then solidifying the precursor to form a reflective layer. It is also distinguished from a reflective layer formed by deposition of minute parcels of material onto a transparent microsphere to build up a reflective layer, such as in the vapor deposition of metals onto transparent microspheres as conventionally performed.

Figure 9:
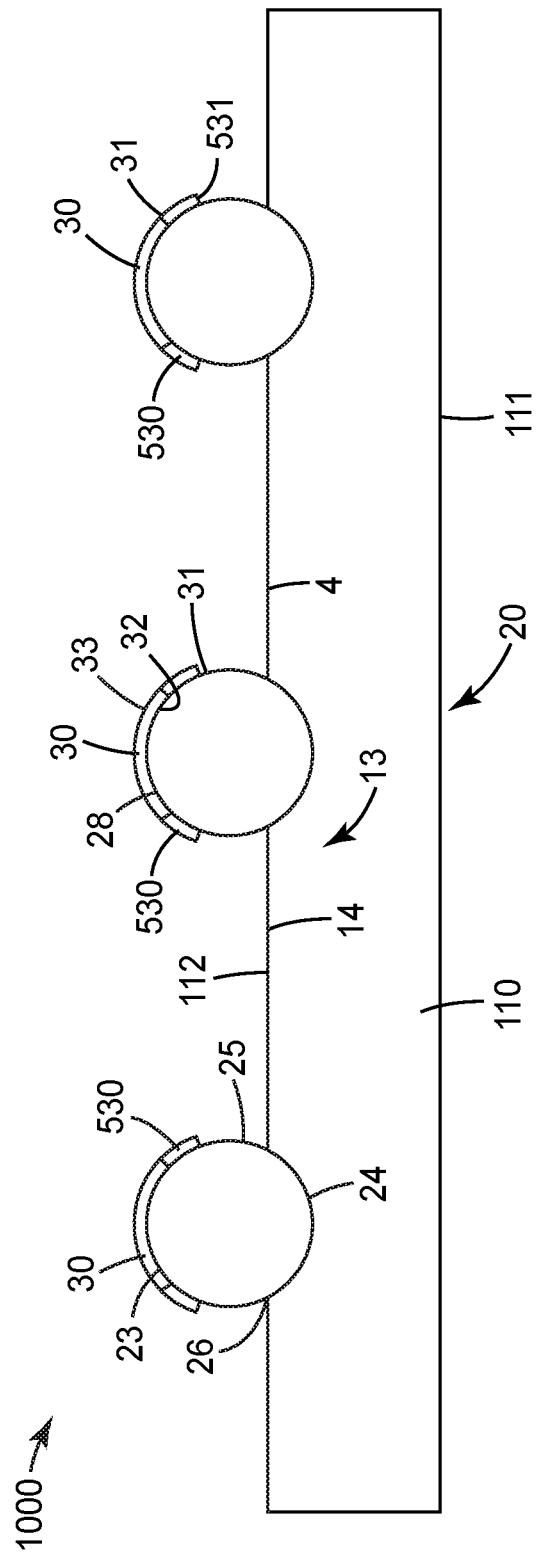
FIG. 9 is a side schematic cross sectional view of an exemplary intermediate article, comprising a carrier layer bearing transparent microspheres with first and second exemplary locally-laminated layers disposed thereon.

To perform such a lamination, a multilayer transfer stack that comprises a functional (e.g. reflective) layer 30 can be brought into close proximity with a protruding area 25 of a transparent microsphere 21 disposed on a temporary carrier 110, so that a local area of the functional layer contacts at least a portion of a bonding layer 50 that is present on at least a portion of the protruding area 25 of the microsphere. This local area of the functional layer is then physically transferred to, and bonded to, this portion of the bonding layer, thus bonding this local area of the reflective layer to an area 28 of protruding area 25 of the microsphere. (This will form an intermediate article of the general type depicted in FIG. 9 and discussed in detail later herein.) When a binder layer is formed as described in detail later herein, protruding area 25 of the microsphere then becomes an embedded area of the microsphere, also as discussed in detail later herein.

In a local lamination process as defined herein, a local area of a pre-made functional (e.g. reflective) layer is transferred to portion of a protruding area of a transparent microsphere. During this process, the local area of the functional layer is detached from (breaks free of) a region of the functional layer that previously (in the pre-made layer before lamination) laterally surrounded the transferred area.

The laterally-surrounding region of the functional layer from which the local area was detached is not transferred to the microsphere (or to any portion of the resulting article) but rather is removed from the vicinity of the microsphere (e.g., along with other, sacrificial layers of the multilayer transfer stack). A locally-laminated reflective layer is thus a "microscopically" laminated layer that is distinguished from a reflective layer that results from large-scale lamination to a substrate without any laminated portion of the reflective layer being detached from other regions of the reflective layer. The breaking away of locally-laminated areas of the functional layer from their respective laterally-surrounding regions of the functional layer is not governed by any pre-determined lines of weakness in the functional layer. Rather, the breaking away is a result of the local deformation that the local areas of the functional layer undergo on being forcibly conformed onto the surfaces of the microspheres.

In such a lamination process, the local area of the functional layer that is transferred to the microsphere will release (delaminate) from other layer(s) of the multilayer transfer stack that rearwardly abutted this local area, as will be made clear by later discussions herein. This may be facilitated by providing a release interface in the multilayer transfer stack. In many convenient embodiments such a release interface may be provided by a major surface of a release layer that is present in the transfer stack. In some embodiments the release layer may be in direct contact with a major surface of the functional layer; in such cases the release interface will be the interface between the major surface of the functional layer and the major surface of the release layer. However, in many embodiments at least one additional layer may be present between the functional layer and the release layer; in such cases the release interface will be the interface between the major surface of this additional layer and the major surface of the release layer. In some embodiments this additional layer will be a selective-bonding layer that exhibits differential bonding/release on its two major surfaces. For example, one major surface of this layer may non-releasably bond to a major surface of the functional layer, while an opposing major surface of this layer may releasably bond to a major surface of the release layer to form the release interface, as discussed in detail later herein.

Figure 3:
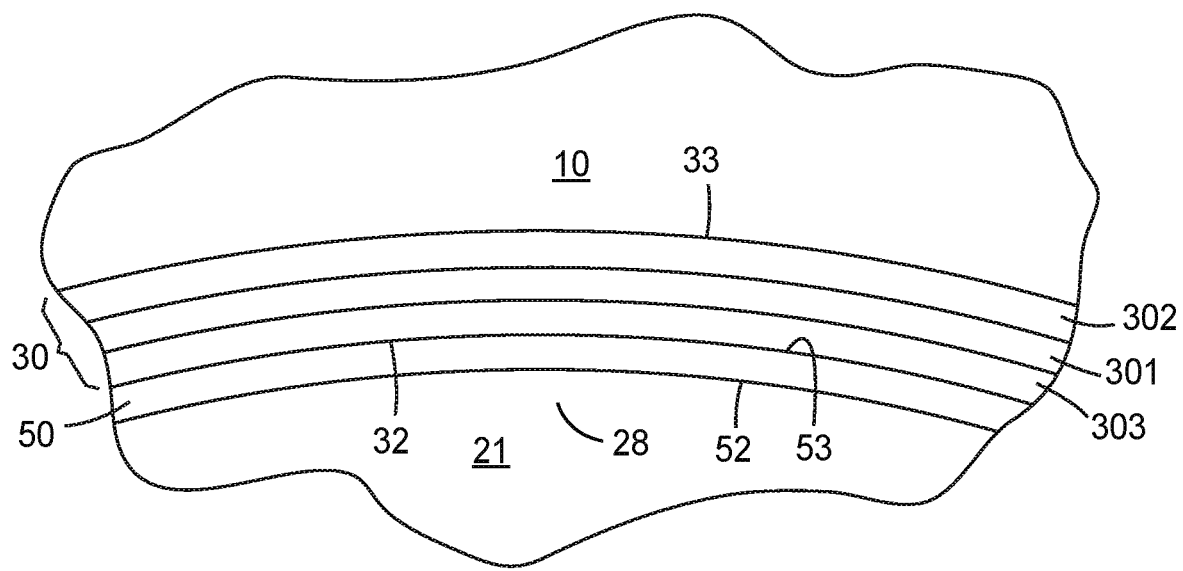
FIG. 3 is a magnified cross sectional view showing details of another exemplary locally-laminated layer.

In some embodiments a release layer may be a sacrificial layer that does not transfer to, or remain in, the final retroreflective article and that thus may be removed and recycled, reused or disposed (thus no release layer is visible in FIG. 2 or 3). In some embodiments a selective-bonding layer 303 may remain in the final retroreflective article as in the exemplary designs of FIGS. 2 and 3. In some embodiments, a multilayer transfer stack may optionally comprise an embrittlement layer that enhances the ability of a local area of the functional layer to break free of the region of the functional layer that previously laterally surrounded it. In some embodiments, embrittlement layer 302 remains in the final retroreflective article, as in the exemplary designs of FIGS. 2 and 3.

U.S. Provisional Patent Application 62/478,992 and International Application Publication No. 2018/178802 describe transfer stacks (referred to as transfer articles) which may be suitable for laminating various "function" layers, and are incorporated by reference in their entireties herein. It will be appreciated that a reflective layer as described herein corresponds to a particular type of "function" layer as described in the '992 application. The '992 application also describes compositions (e.g. acrylate compositions) that are particularly suitable for use as selective-bonding layers. Locally-laminated reflective layers and the use of multilayer transfer stacks to provide such layers are discussed in detail in U.S. Provisional Patent Application No. 62/578,343 (e.g., in Example 2.3 (including Examples 2.3.1-2.3.3) and Example 2.4 (including Examples 2.4.1-2.4.5)), which is incorporated by reference in its entirety herein. Still further details and discussions are provided in U.S. Provisional Patent Application 62/739,506 and in PCT International Patent Application No. US2018/057553, both of which are incorporated by reference in their entirety herein.

The following discussions are couched in terms of a single layer (e.g. a single reflective layer) but will be understood to be applicable to locally-laminated first layers and second layers. Although the following discussions may mention reflective layers, they will also be understood to be applicable to locally-laminated functional layers that are non-reflective, e.g. that are provided for purposes of passivating a region of a transparent microsphere.

A locally-laminated layer as defined and described herein will be identifiable and will be distinguishable from other layers, e.g. from reflective layers that are not locally-laminated. Locally-laminated reflective layers will be distinguished from conventional, continuous reflective layers by virtue of the locally-laminated layers being present as numerous, discontinuous, discrete entities. In some embodiments many (e.g. greater than 60, 80, 90 or 95%) such locally-laminated layers may each exhibit a contiguous area, when viewed along the front-rear axis of the retroreflective article, of e.g. less than 0.5, 0.2, 0.1, 0.05, or 0.01 square mm. This will be distinguished from, for example, retroreflective articles comprising conventional reflective layers (e.g. vapor-coated metal layers) which may be contiguous over macroscopic areas of e.g. several square mm or more).

Beyond this, locally-laminated layers may exhibit at least some features which reveal that the layers were made by transfer of local areas of a pre-made layer, rather than being deposited onto the microspheres e.g. in the vapor phase or as a flowable precursor. Thus, a locally-laminated reflective layer will be distinguishable e.g. from a reflective layer obtained by direct vapor-coating of a metal reflective layer or a dielectric-stack reflective layer onto a microsphere, from a reflective layer obtained by printing a reflective layer precursor (e.g. a silver ink) onto a microsphere, and so on.

Such distinguishing characteristics might include, for example, the appearance of minor edges of a layer indicating that the layer was locally detached from (e.g. broken off from) a layer of material that previously laterally surrounded the broken-off area. Other distinguishing characteristics may also be found that result from the unique nature of the local lamination of a layer to a microsphere. To perform local lamination of a layer, it is necessary for the layer to be at least generally conformed to the shape of a protruding area of a microsphere. Since the layer comprises at most single-axis curvature and the protruding portion of the microsphere comprises multiple axes of curvature, the layer cannot conform to the multiple-axis-of-curvature microsphere surface without exhibiting at least some wrinkling, crumpling, folding, fracturing, or the like. (This may be particularly true given the small radius of curvature of transparent microspheres typically used in retroreflective articles.) Such features can thus provide evidence indicating that the layer is a locally-laminated layer.

In many embodiments locally-laminated layers have been found to exhibit characteristic discontinuities in the form of cracks or gaps, which appear to be the result of fracturing due to bending and/or stretching that occurred during the process of conforming the layer to the protruding portion of the microsphere. Thus, features such as fracture lines, cracks or gaps in a layer present on a transparent microsphere can provide evidence that the layer is a locally-laminated layer. It will be still further appreciated that in some instances locally-laminated layers may be identified by the presence of an embrittlement layer and/or a selective-bonding layer as described in detail elsewhere herein. Based on the above discussions it will be appreciated that a locally-laminated layer can be identified and distinguished from other layers by any of several properties that may serve as an indicator that the layer is a locally-laminated layer. Methods of identifying and characterizing locally-laminated layers are discussed in further detail in U.S. Provisional Patent Application 62/739,506 and in PCT International Patent Application No. US2018/057553, both of which are incorporated by reference in their entirety herein.

It is emphasized that locally-laminated reflective layers comprising discontinuities such as e.g. wrinkles, cracks and/or gaps, and exhibiting considerable variation and non-uniformity, can nevertheless work well to provide acceptable retroreflectivity. It will be appreciated that this is a surprising result considering that past approaches to achieving retroreflectivity have typically involved providing reflective layers that are extremely consistent, uniform, and uninterrupted over the extent of individual microspheres, that conform to the curvature of the microspheres (or a bonding layer thereon) with exacting fidelity.

The following discussions are couched primarily in terms of a single layer (e.g. a single reflective layer) but will be understood to be applicable to locally-laminated first layers and second layers. Although the following discussions may mention reflective layers, they will also be understood to be applicable to locally-laminated functional layers that are non-reflective.

As illustrated in exemplary embodiment in FIG. 1, at least some of the locally-laminated functional layers (e.g. reflective layers) 30 and/or 530 of retroreflective elements 20 of retroreflective article 1 may be embedded layers. In various embodiments, at least generally, substantially, or essentially all of the functional layers of retroreflective elements 20 will be embedded layers.

An embedded layer is a layer that is disposed adjacent to a portion of an embedded area 25 of a transparent microsphere 21 as shown in exemplary embodiment for layers 30 and 530 in FIG. 1. An embedded layer will at least generally conform to a portion (often including a rearmost portion) of the embedded area 25 of a transparent microsphere 21. By definition an embedded layer will be completely surrounded (e.g. sandwiched) by the combination of at least the binder layer 10 and the transparent microsphere 21 (noting that in some embodiments some other layer or layers, e.g. an intervening layer such as a bonding layer and/or a color layer, may also be present in article 1, as discussed later herein, and may contribute to the surrounding of the embedded layer). In other words, the minor edges of embedded layer (e.g. edges 31 of layer 30, and edges 531 of layer 530, as depicted in exemplary embodiment in FIG. 1) will be "buried" between the transparent microsphere 21 and the binder layer 10 (and possibly other layers) rather than being exposed. That is, the locations 26 that mark the boundary between an exposed area 24 of a microsphere and an embedded area 25 of a microsphere (which locations may be referred to as the "waist" of the microsphere), will be abutted by an edge 16 of binder layer 10 (or an edge of layer disposed thereon) rather than by a minor edge of an embedded layer 30 or 530.

For a transparent microsphere 21 that comprises an embedded layer, no part of the embedded layer will be exposed so as to extend onto (i.e., cover) any portion of exposed area 24 of microsphere 21. It will be appreciated that in actual industrial production of retroreflective articles of the general type disclosed herein, small-scale statistical fluctuations may inevitably be present that may result in the formation of a very small number of e.g. minor portions of a layer, e.g. a reflective layer, that exhibit a minor edge or area that is exposed rather than being buried. Such occasional occurrences are to be expected in any real-life production process; however, embedded layers as disclosed herein are distinguished from circumstances in which layers are purposefully arranged in a manner in which they will exhibit a large number of exposed minor edges or areas.

In some embodiments an embedded layer (e.g. 30 or 530) will be a localized layer as shown in exemplary embodiment in FIG. 1. By definition, a localized layer is an embedded layer that does not comprise any portion that extends away from an embedded area 25 of a microsphere 21 along any lateral dimension of article 1 to an extent sufficient to bridge a lateral gap between neighboring transparent microspheres 21. In some embodiments, at least generally, substantially, or essentially all (according to the previously-provided definitions) of the embedded functional layers (30 and 530) of a retroreflective article will be localized layers.

However, in some embodiments a locally-laminated layer can be a "bridging" layer that can bridge multiple (at least two) transparent microspheres. A layer that bridges microspheres is a layer having a first section that is positioned generally rearward of at least a portion of a first microsphere and a second section that is positioned generally rearward of at least a portion of a second microsphere. A single such functional layer may thus operate (e.g. to provide reflection) in conjunction with two (or more) transparent microspheres and will be termed a "bridging" layer. Some bridging microspheres may comprise other sections that are positioned generally rearward of other microspheres. In various embodiments, bridging layers may bridge two, three, four, or as many as ten microspheres.

Bridging layers are not localized layers as defined herein, however, the perimeter edges of bridging layers are buried between the transparent microspheres and the binder material; bridging layers are thus "embedded" layers. It will be appreciated that the presence of bridging layers may be statistically-occurring and that, in some embodiments, the majority of locally-laminated layers may be localized layers, with each such layer serving a single transparent microsphere.

FIG. 4 is a magnified isolated perspective view of a transparent microsphere 21 and an exemplary locally-laminated first layer 30 and an exemplary locally-laminated second layer 530. (In FIG. 4, a binder layer 10 (described later herein), is omitted for ease of visualizing layers 30 and 530.) FIG. 5 is a magnified isolated side schematic cross sectional view of a transparent microsphere and an exemplary locally-laminated first layer 30 and an exemplary locally-laminated second layer 530. (In FIGS. 4 and 5, layers 30 and 530 are both embedded, and localized.) As shown in these Figures, a first layer 30 will comprise a major forward surface 32 that often exhibits a generally arcuate shape, e.g. in which at least a portion of forward surface 32 at least generally conforms to a portion of a major rearward surface 23 of microsphere 21. In some embodiments, major forward surface 32 of layer 30 may be in direct contact with major rearward surface 23 of microsphere 21; however, in some embodiments major forward surface 32 of layer 30 may be in contact with a layer that is itself disposed on major rearward surface 23 of microsphere 21, as discussed in further detail elsewhere herein. A layer that is disposed in this manner may be, e.g., a transparent layer that serves e.g. as a protective layer, as a tie layer, as a bonding layer, or adhesion-promoting layer; or, such a layer may be an optical retarder layer or a color layer. In some embodiments such a layer may serve multiple functions (e.g. it may serve as a color layer and a bonding layer). A major rearward surface 33 of layer 30 (e.g. a surface that is in contact with forward-facing surface 12 of binder layer 10 as shown in FIG. 1, or a surface of a layer present thereon) may be, but does not necessarily have to be, at least generally congruent with (e.g. locally parallel to) the major forward surface 32 of reflective layer 30. This may depend e.g. on the particular manner in which the reflective layer is disposed on the transparent microspheres, as discussed later herein.

Similarly, a second layer 530 will comprise a major forward surface 532 that often exhibits a generally arcuate shape, e.g. in which at least a portion of forward surface 532 at least generally conforms to a portion of a major rearward surface 23 of microsphere 21. In some embodiments, major forward surface 532 of layer 530 may be in direct contact with major rearward surface 23 of microsphere 21; however, in some embodiments major forward surface 532 of layer 30 may be in contact with a layer that is itself disposed on major rearward surface 23 of microsphere 21, as discussed above. A major rearward surface 533 of layer 530 (e.g. a surface that is in contact with forward-facing surface 12 of binder layer 10 as shown in FIG. 1, or a surface of a layer present thereon) may be, but does not necessarily have to be, at least generally congruent with (e.g. locally parallel to) the major forward surface 532 of layer 530. (These discussions apply to a portion of second layer 530 that is positioned in parallel to first layer 30; if a layer 530 comprises a portion that is in series with layer 30, that portion may comprise a forward surface 532 that is in contact with a rearward surface 33 of first layer 30 as noted above).

It will be appreciated that in some embodiments, layers may be locally laminated onto microspheres by being transferred to protruding portions thereof, while the microspheres are partially (and temporarily) embedded in a carrier. Since different microspheres may vary slightly in diameter, and/or there may be variations in the depth to which different microspheres are embedded in the carrier, different microspheres may protrude different distances outward from the carrier. In some cases microspheres that protrude further outward from the carrier may receive a greater amount of material locally transferred thereto, in comparison to microspheres that are more deeply embedded in the carrier. This being the case, it will be understood that the locally-laminated layers of various microspheres may differ from each other in terms of the angular arc occupied by the layers. This and all similar parameters will be understood to be obtained in the form of averages taken over multiple retroreflective elements, microspheres, and locally-laminated layers, unless otherwise specified.

A locally-laminated layer may exhibit any suitable thickness (e.g. average thickness, measured at several locations over the extent of the layer). It will be appreciated that different methods of making such a layer may give rise to layers of differing thickness. In various embodiments, a locally-laminated layer may exhibit an average thickness (e.g. measured at several locations over the extent of the layer) of from at least 0.01, 0.05, 0.1, 0.2, 0.5, 1, 2, 4, or 8 microns, to at most 100, 80, 60, 40, 20, 10, 7, 5, 4, 3, 2 or 1 microns. In various other embodiments, a locally-laminated layer may comprise an average thickness of at least 10, 20, 40 or 80 nanometers; in further embodiments such a layer may comprise an average thickness of at most 10, 5, 2 or 1 microns, or of at most 400, 200 or 100 nanometers. If the layer (or set of sublayers, e.g. of a dielectric stack) is a layer of a multilayer stack (e.g. a transfer stack as described later herein), these thicknesses apply only to the transferred layer itself.

Conventional approaches to producing retroreflective articles (whether using e.g. vapor-coated transparent microspheres, prismatic elements such as cube-corners, etc.) typically seek to achieve as much uniformity in geometric parameters as possible. It is thus evident that the approaches disclosed herein differ sharply from conventional approaches to producing retroreflective articles. The present arrangements tolerate considerable variation in the shape, size, etc. of the various reflective layers, as long as acceptable overall performance (e.g. a balance between retroreflectivity in retroreflected light and color fidelity/vividness in ambient light) is achieved.

Still further, in some embodiments a number of transparent microspheres may completely lack a locally-laminated layer, e.g. a locally-laminated reflective layer. That is, in some embodiments local lamination methods may leave a number of microspheres without a reflective layer disposed thereon. The presence of some transparent microspheres that lack reflective layers disposed thereon has been found to be acceptable (e.g., a sufficiently high coefficient of retroreflectivity can still be attained) in many circumstances. In various embodiments, at least 30, 50, 70, or 90 percent of the retroreflective elements of the retroreflective article each comprise a first locally-laminated, embedded reflective layer and/or a second locally-laminated, embedded reflective layer.

As noted, in some embodiments, a locally-laminated reflective layer (e.g. 30 or 530) may comprise a metal reflecting layer, e.g. a single layer, or multiple layers, of vapor-deposited metal (e.g. aluminum or silver). In some embodiments, a locally-laminated reflective layer may comprise a dielectric reflecting layer, comprised of an optical stack of high and low refractive index layers that combine to provide reflective properties. Dielectric reflecting layers are described in further detail in U.S. Patent Application Publication No. 2017/0131444, which is incorporated by reference in its entirety herein for this purpose. In particular embodiments, a dielectric reflecting layer may be a so-called layer-by-layer (LBL) structure in which each layer of the optical stack (i.e., each high-index layer and each low-index layer) is itself comprised of a substack of multiple bilayers. Each bilayer is in turn comprised of a first sub-layer (e.g. a positively charged sub-layer) and a second sub-layer (e.g. a negatively charged sub-layer). At least one sub-layer of the bilayers of the high-index substack will comprise ingredients that impart a high refractive index, while at least one sub-layer of the bilayers of the low-index substack will comprise ingredients that impart a low refractive index. LBL structures, methods of making such structures, and retroreflective articles comprising dielectric reflecting layers comprising such structures, are described in detail in U.S. Patent Application Publication No. 2017/0276844, which is incorporated by reference in its entirety herein. In some embodiments a reflecting layer thus may comprise multiple sublayers. In some embodiments a hybrid configuration may be used in which metal reflecting layers and dielectric reflecting layers may both be present, e.g. as discussed in U.S. Patent Application Publication 2017/0192142. In some embodiments a layer of a transfer stack (e.g. a selective-bonding layer 303 or an embrittlement layer 302 as described elsewhere herein) may serve as a layer of a dielectric stack.

As shown in exemplary embodiment in FIG. 1, in some embodiments an intervening layer 50 (e.g. a transparent layer of organic polymeric material) may be provided so that a portion, or the entirety, of the intervening layer is rearward of a microsphere 21 and forward of at least a portion of a locally-laminated layer 30 and/or 530. At least a portion of such an intervening layer 50 may thus be sandwiched between microsphere 21 and layer 30 and/or 530, e.g. with a forward surface 52 of intervening layer 50 being in contact with a rearward surface of embedded area 25 of microsphere 21, and with a rearward surface 53 of intervening layer 50 being in contact with forward surface 32 of layer 30 or forward surface 532 of layer 530. In some embodiments such a layer 50 may be continuous so as to have portions that reside on front surface 4 of article 1 in addition to being present rearward of microspheres 21, as in the exemplary arrangement of FIG. 1. In other embodiments such a layer may be discontinuous (e.g., it may be a localized, embedded layer) and may only be present rearward of microspheres 21. Furthermore, even a "continuous" layer 50 may exhibit occasional through-holes or cavities in places where the layer precursor did not fully wet into gaps between the microspheres 21, as noted earlier.

Such an intervening layer may serve any desired function. In some embodiments it may serve as a physically-protective layer and/or a chemically-protective layer (e.g. that provides enhanced abrasion resistance, resistance to corrosion, etc.). In some embodiments such a layer may serve as a bonding layer (e.g. a tie layer or adhesion-promoting layer) that is capable of being bonded to by a functional layer, e.g. a reflective layer. In some embodiments such a layer may serve as a passivation layer, or as an optical retarder layer. It will be appreciated that some intervening layers may serve more than one, e.g. all, of these purposes. In some embodiments, such an intervening layer may be transparent (specifically, it may be at least essentially free of any colorant or the like). Organic polymeric layers (e.g. protective layers) and potentially suitable compositions thereof are described in detail in U.S. Patent Application Publication No. 2017/0276844, which is incorporated by reference in its entirety herein. In particular embodiments, such a layer may be comprised of a polyurethane material. Various polyurethane materials that may be suitable for such purposes are described e.g. in U.S. Patent Application Publication No. 2017/0131444, which is incorporated by reference in its entirety herein.

In some embodiments at least some of the retroreflective elements may comprise at least one color layer. In various embodiments, a color layer may be one of the first and second layers as defined and described previously herein; or, a color layer may be a separate, additional layer. The term "color layer" is used herein to signify a layer that preferentially allows passage of electromagnetic radiation in at least one wavelength range between 380 nm and 1 mm, while preferentially minimizing passage of electromagnetic radiation in at least one other wavelength range between 380 nm and 1 mm by absorbing at least some of the radiation of that wavelength range. A color layer as defined herein performs wavelength-selective absorption of electromagnetic radiation by the use of a colorant (e.g. a dye or pigment) that is disposed in the color layer. A color layer is thus distinguished from a reflective layer (and from a transparent layer), as will be well understood by ordinary artisans based on the discussions herein. Color layers of various types are described in U.S. Provisional Patent Application 62/675,020 and in PCT International Patent Application No. US2018/057555. Any such color layer can be arranged so that light that is retroreflected by a retroreflective element passes through the color layer so that the retroreflected light exhibits a color imparted by the color layer. In some embodiments, a color layer may serve some other function (e.g. as a bonding layer, an adhesion-promoting layer, or a tie layer) in addition to imparting color to the retroreflected light.

In some embodiments a color layer may be a discontinuous color layer, e.g. a localized color layer. In particular embodiments a localized color layer may be an embedded color layer (with the terms localized and embedded having the same meanings as discussed above). The presence of color layers (e.g. localized, embedded color layers) in at least some of the retroreflective light paths of a retroreflective article can allow the article to comprise at least some areas that exhibit colored retroreflected light, irrespective of the color(s) that these areas (or any other areas of the article) exhibit in ambient (non-retroreflected) light.

A retroreflective article 1 may be arranged to provide that the appearance of article 1 in ambient (non-retroreflected) light is controlled as desired. For example, in the exemplary arrangement of FIG. 6 the front surface 4 of article 1 will be provided (after removal of carrier 110) in part (e.g. in areas of front side 2 of article 1 that are not occupied by transparent microspheres 21) by a visually exposed front surface 14 of binder layer 10. In such embodiments the appearance of front side 2 of article 1 in ambient light may thus be affected by the color (or lack thereof) of binder layer 10 in areas 13 of binder layer 10 that are laterally between microspheres 21. Similar effects may be achieved in arrangements of the type shown in FIG. 1, if continuous layer 50 is a transparent layer. Thus in some embodiments binder layer 10 may be a colorant-loaded (e.g. pigment-loaded) binder layer. The pigment may be chosen to impart any suitable color in ambient light, e.g. fluorescent yellow, green, orange, white, black, and so on. As noted, the arrangements herein can, in certain embodiments, allow the native color of the binder layer and retroreflective article to be more fully realized.

In some embodiments the appearance of retroreflective article 1 in ambient light may be manipulated e.g. by the presence and arrangement of one or more color layers on a front side of article 1. In some embodiments any such color layers, e.g. in combination with a colorant-loaded binder, may be configured so that the front side of article 1 exhibits a desired image (which term broadly encompasses e.g. informational indicia, signage, aesthetic designs, and so on) when viewed in ambient light. In some embodiments, article 1 may be configured (whether through manipulation of reflective layers and/or manipulation of any color layers in the retroreflective light path) to exhibit images when viewed in retroreflected light. In other words, any arrangement by which the appearance of article 1 in ambient light may be affected (e.g. by the use of a colorant-loaded binder, the use of colorant-loaded layers on the front side 4 of article 1, etc.) may be used in combination with any arrangement by which the appearance of article 1 in retroreflected light may be manipulated (e.g. by the use of color layers, e.g. localized, embedded color layers, in the retroreflective light path).

As noted, in some situations the appearance of article 1 in ambient light may be of lesser importance or may not be a significant consideration, e.g. in circumstances in which the wavelength-dependence of the article's retroreflectivity, in particular how this dependence changes with entrance angle, is of primary importance.

Figure 6:
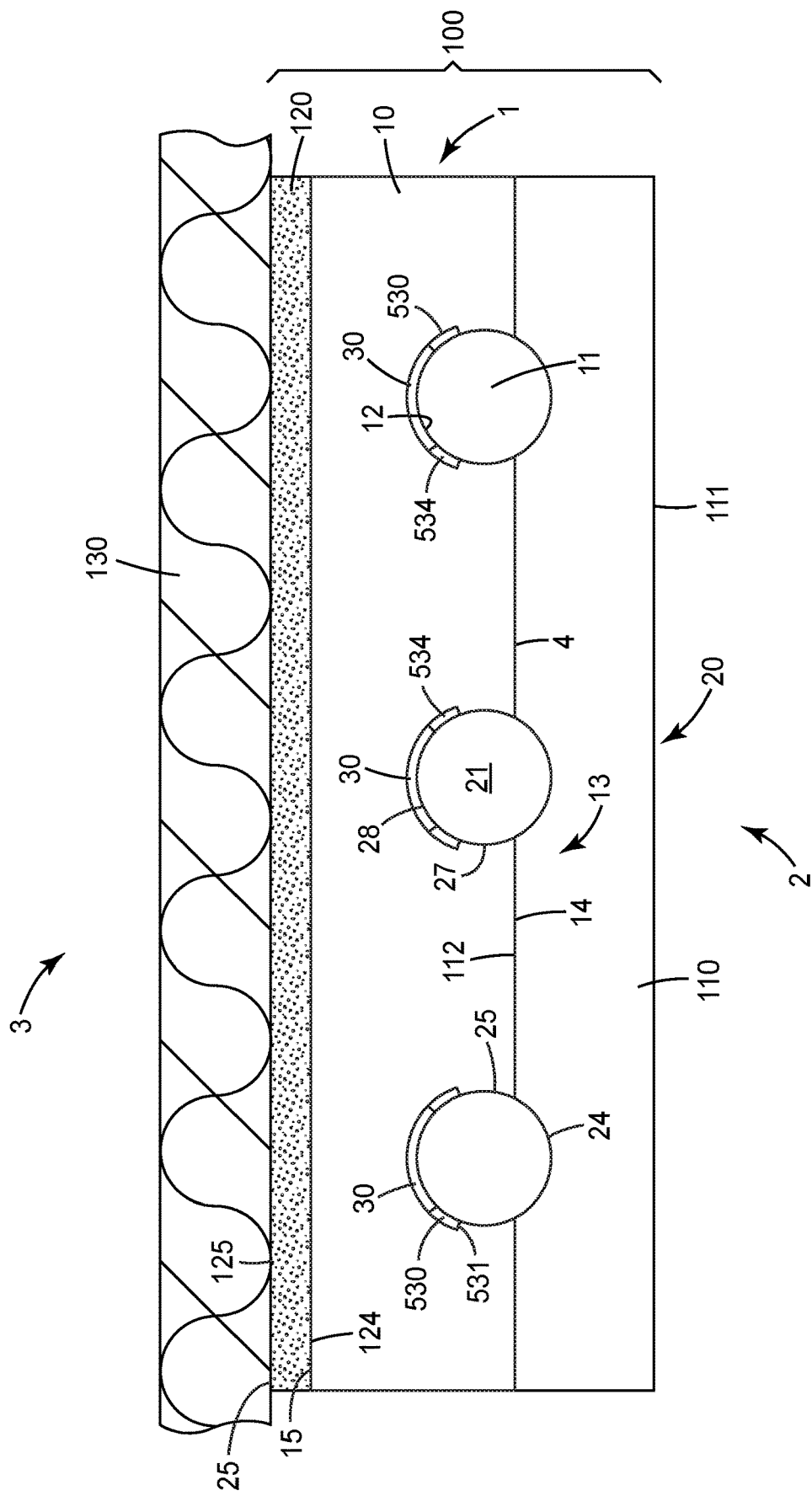
FIG. 6 is a side schematic cross sectional view of an exemplary transfer article comprising an exemplary retroreflective article with first and second exemplary locally-laminated layers, with the transfer article shown coupled to a substrate.

In some embodiments of the general type shown in FIG. 6, a retroreflective article 1 as disclosed herein may be provided as part of a transfer article 100 that comprises retroreflective article 1 along with a removable (disposable) carrier layer 110 that comprises front and rear major surfaces 111 and 112. In some convenient embodiments, retroreflective article 1 may be built on such a carrier layer 110, which may be removed for eventual use of article 1 as described later herein. For example, a front side 2 of article 1 may be in releasable contact with a rear surface 112 of a carrier layer 110, as shown in exemplary embodiment in FIG. 6.

Retroreflective article 1 (e.g. while still a part of a transfer article 100) may be coupled to any desired substrate 130, as shown in FIG. 6. This may be done in any suitable manner. In some embodiments this may be done by the use of a bonding layer 120 that couples article 1 to substrate 130 with the rear side 3 of article 1 facing substrate 130. Such a bonding layer 120 can bond binder layer 10 (or any layer rearwardly disposed thereon) of article 1 to substrate 130, e.g. with one major surface 124 of bonding layer 120 being bonded to rear surface 15 of binder layer 10, and with the other, opposing major surface 125 of bonding layer 120 bonded to substrate 130. Such a bonding layer 120 may be e.g. a pressure-sensitive adhesive (of any suitable type and composition) or a heat-activated adhesive (e.g. an "iron-on" bonding layer).

The term "substrate" is used broadly and encompasses any item, portion of an item, or collection of items, to which it is desired to e.g. couple or mount a retroreflective article 1. Furthermore, the concept of a retroreflective article that is coupled to or mounted on a substrate is not limited to a configuration in which the retroreflective article is e.g. attached to a major surface of the substrate. Rather, in some embodiments a retroreflective article may be e.g. a strip, filament, or any suitable high-aspect ratio article that is e.g. threaded, woven, sewn or otherwise inserted into and/or through a substrate so that at least some portions of the retroreflective article are visible. In fact, such a retroreflective article (e.g. in the form of a yarn) may be assembled (e.g. woven) with other, e.g. non-retroreflective articles (e.g. non-retroreflective yarns) to form a substrate in which at least some portions of the retroreflective article are visible. The concept of a retroreflective article that is coupled to a substrate thus encompasses cases in which the article effectively becomes a part of the substrate.

In some embodiments, substrate 130 may be a portion of a garment. The term "garment" is used broadly, and generally encompasses any item or portion thereof that is intended to be worn, carried, or otherwise present on or near the body of a user. In such embodiments article 1 may be coupled directly to a garment e.g. by a bonding layer 120 (or by sewing, or any other suitable method). In other embodiments substrate 130 may itself be a support layer to which article 1 is coupled e.g. by bonding or sewing and that adds mechanical integrity and stability to the article. The entire assembly, including the support layer, can then be coupled to any suitable item (e.g. a garment) as desired. Often, it may be convenient for carrier 110 to remain in place during the coupling of article 1 to a desired entity and to then be removed after the coupling is complete. Strictly speaking, while carrier 110 remains in place on the front side of article 1, the areas 24 of transparent microspheres 21 will not yet be air-exposed and thus the retroreflective elements 20 may not yet exhibit the desired level of retroreflectivity. However, an article 1 that is detachably disposed on a carrier 110 that is to be removed for actual use of article 1 as a retroreflector, will still be considered to be a retroreflective article as characterized herein.

In some convenient embodiments, a retroreflective article 1 can be made by starting with a disposable carrier layer 110. Transparent microspheres 21 can be partially (and releasably) embedded into carrier layer 110 to form a substantially mono-layer of microspheres. For such purposes, in some embodiments carrier layer 110 may conveniently comprise e.g. a heat-softenable polymeric material that can be heated and the microspheres deposited thereonto in such manner that they partially embed therein. The carrier layer can then be cooled so as to releasably retain the microspheres in that condition for further processing.

Typically, the microspheres as deposited are at least slightly laterally spaced apart from each other although occasional microspheres may be in lateral contact with each other. The pattern (that is, the packing density or proportional area coverage) of microspheres as deposited on the carrier will dictate their pattern in the final article. In some embodiments the microspheres may be provided in a predetermined pattern, e.g. by using the methods described in U.S. Patent Application Publication 2017/0293056, which is incorporated by reference herein in its entirety.

In various embodiments the microspheres 21 may be partially embedded in carrier 110 e.g. to about 20 to 50 percent of the microspheres' diameter. The areas 25 of microspheres 21 that are not embedded in the carrier protrude outward from the carrier so that they can subsequently receive locally-laminated layers 30 and 530 and binder layer 10 (and any other layers as desired). These areas 25 (which will form the embedded areas 25 of the microspheres in the final article) will be referred to herein as protruding areas of the microspheres during the time that the microspheres are disposed on the carrier layer in the absence of a binder layer. In customary manufacturing processes, there may be some variation in how deeply the different microspheres are embedded into carrier 110, which may affect the size and/or shape of the layers that are locally laminated onto portions of the protruding surfaces of the different microspheres.

A carrier layer comprising transparent microspheres thereon is described in the Working Examples herein as a Temporary Bead Carrier. Such a microsphere-bearing carrier, with an organic polymer intervening layer (e.g. a bonding layer) deposited thereon is referred to in the Working Examples as a Polymer Coated Bead Carrier. Further details of suitable carrier layers, methods of temporarily embedding transparent microspheres in carrier layers, and methods of using such layers to produce retroreflective articles, are disclosed in U.S. Patent Application Publication No. 2017/0276844.

After microspheres 21 are partially embedded in carrier 110 (and e.g. coated with an organic polymeric layer), first and second functional layers 30 and 530, e.g. reflective layers (that will become embedded layers after formation of binder layer 10) can be formed on portions of protruding areas 25 of at least some of the microspheres. This will form an intermediate article 1000 as shown in exemplary embodiment in FIG. 9, which is discussed in more detail later herein.

In many embodiments local lamination may be performed so that layers are locally transferred to only on portions of protruding areas 25 of microspheres 21 and not, for example, to the surface 112 of the carrier 110. Any such process may be controlled so that a layer is not transferred to the entirety of the protruding area 25 of a microsphere 21. That is, in some embodiments the process may be carried out so that a layer is transferred only to an outermost portion of the protruding area 25 of microsphere 21 (which outermost portion will become the rearmost portion of embedded area 25 of microsphere 21 in the final article). Such a first lamination process may, for example, provide a first layer as a "polar-cap" layer of the general type described earlier herein. In some embodiments, a second, subsequent lamination process may, for example, provide a second layer as spherical segment layer that occupies a larger angular arc of the microsphere, than does the first layer. Methods for achieving such arrangements are discussed in detail below.

The following discussions are couched in terms of a single layer (e.g. a single reflective layer) but will be understood to be applicable to locally-laminated first layers and second layers. Although the following discussions may mention reflective layers, they will also be understood to be applicable to locally-laminated functional layers that are non-reflective.

To perform the herein-described local lamination of a functional layer onto protruding portions of transparent microspheres, arrangements must be made that enable a pre-made layer to be brought into contact with carrier-borne transparent microspheres and portions of the pre-made layer laminated thereto. Such arrangements can be facilitated by providing the functional layer as part of a multilayer transfer stack that includes a release interface that allows the functional layer to be separated from other layers of the stack. In some embodiments of this general type, a functional layer (e.g. a reflective layer) 30 may be provided as part of a multilayer transfer stack 350 as shown in exemplary embodiment in FIG. 7. Exemplary transfer stack 350 includes a functional layer 30 that is reflective layer 30, which layer comprises a reflecting layer 301 sandwiched between a forward embrittlement layer 302 and a rearward selective-bonding layer 303. Transfer stack 350 further includes a releasable support assembly 360, which comprises a support substrate 361 and a release layer 362. These layers are arranged so that a rearward surface of selective-bonding layer 303 is in contact with a forward surface of release layer 362 to form a release interface 331. The forward surface of selective-bonding layer 303 is in contact with reflecting layer 301 and is non-releasably bonded thereto. Layer 303 thus establishes a selective-release interface 331 and a selective-bonding interface 332, hence the designation of layer 303 as a selective-bonding layer.

Figure 7:
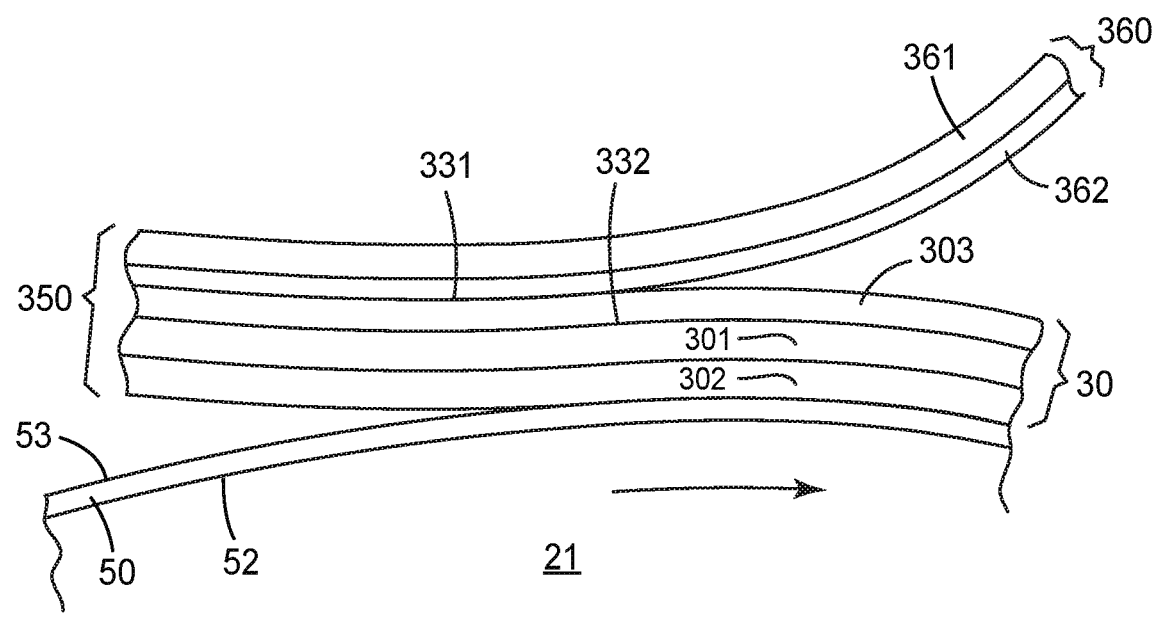
FIG. 7 is a side schematic cross sectional view of an exemplary process for locally laminating a layer to a portion of a protruding transparent microsphere.

Multilayer transfer stack 350 may be brought into contact with a protruding portion of a carrier-borne microsphere 21, as shown in exemplary embodiment in FIG. 7. The forward-most surface of the transfer stack (in this case, a forward surface of embrittlement layer 302) is brought into contact with surface 53 of a bonding layer 50 provided on at least the protruding portion of microsphere 21. A bond is established between layer 302 and bonding layer 50. Transfer stack 350 having been configured so that interface 331 is a selectively-releasable (weakly-bonded) interface, reflective layer 30 (including embrittlement layer 302, reflecting layer 301, and selective-bonding layer 303) will remain bonded to the protruding portion of the microsphere while releasable support assembly 360 is released from reflective layer 30 (at selective-release interface 331) and is removed.

FIG. 7 is an idealized cross-sectional depiction that does not capture the fact that the lamination is occurring along the multiple-axis-of-curvature surface of the microsphere. Thus, along with the reflective layer 30 releasing from the releasable support assembly 360 as shown in FIG. 7, the local area of pre-made reflective layer 30 that is laminated to microsphere 21 will break away from the region of the pre-made reflective layer that formerly laterally surrounded the local area. (Regions of pre-made reflective layer 30 that are not transferred to the microsphere will typically remain with, and be removed with, the releasable support assembly 360.)

The compositions of the various above-described layers can be chosen as desired. Support substrate 361 of releasable support assembly 360 may be e.g. any suitable organic polymeric film, e.g. polyester, biaxially-oriented polypropylene, and so on. Other potentially useful materials for support substrate 361 are described in the above-cited '992 application.

Release layer 362 may be any suitable material that can be disposed, e.g. deposited, on a major surface of support substrate 361 or any layer thereon. In some embodiments release layer 362 can include a metal layer. The metal layer may include at least one selected from the group consisting of individual metals, two or more metals as mixtures, inter-metallics or alloys, semi-metals or metalloids, metal oxides, metal and mixed metal oxides, metal and mixed metal fluorides, metal and mixed metal nitrides, metal and mixed metal carbides, metal and mixed metal carbonitrides, metal and mixed metal oxynitrides, metal and mixed metal borides, metal and mixed metal oxy borides, metal and mixed metal silicides, diamond-like carbon, diamond-like glass, graphene, and combinations thereof. In some embodiments, the metal layer may conveniently be formed of Al, Zr, Cu, Ni, Cr, Ti, or Nb. In some embodiments release layer 362 can include a doped semiconductor layer. In some embodiments, the doped semiconductor layer may conveniently be formed of Si, B-doped Si, Al-doped Si, and/or P-doped Si. In various embodiments, release layer 362 can be prepared by evaporation, reactive evaporation, sputtering, reactive sputtering, chemical vapor deposition, plasma enhanced chemical vapor deposition, and atomic layer deposition. Preferred methods include vacuum preparations such as sputtering and evaporation.

Selective-bonding layer 303 may comprise any material that exhibits the desired combination of releasability at one major surface and bonding at the other, opposing major surface. In many embodiments such a material may be chosen from various (meth)acrylate and/or (meth)acrylamide materials as discussed in detail in the above-cited '992 provisional application. If the selective-bonding layer is to be formed by flash evaporation of the monomer, vapor deposition, followed by crosslinking, volatilizable (meth)acrylate and/or (meth)acrylamide monomers or oligomers may be used. Suitable materials will exhibit sufficient vapor pressure to be evaporated in an evaporator and condensed into a liquid or solid coating in a vapor coater. Examples of potentially suitable materials are listed in the '992 provisional application. Tricyclodecane dimethanol diacrylate is a particular example of a suitable material, and may be conveniently applied by, e.g., condensed organic coating followed by UV, electron beam, or plasma initiated free radical polymerization.

Reflecting layer 301 may be any suitable reflecting layer (e.g. a layer of metal such as silver or aluminum, or a metal alloy) or collection of sublayers (e.g. it may be a dielectric stack). As noted, in some embodiments layer 30 may be a functional layer that is not reflective and does not include a reflecting layer 301. For example, a functional layer 30 may comprise a release layer that, after lamination of layer 30 to a microsphere, provides a rearward-facing, passivated release surface to which a second layer may not bond to.

Embrittlement layer 302 may be any layer that exhibits suitably brittle properties that can enhance the ability of a transferred area of a pre-made reflective layer to break away from regions of the pre-made reflective layer that previously laterally surrounded the transferred area. (It is emphasized, however, that such an embrittlement layer is optional and that many working example samples have been successfully produced in the absence of an embrittlement layer.) Many silicon oxides (e.g. silicon aluminum oxide ($SiAlO_x$), as achieved e.g. by sputter-coating from a target comprising silicon and aluminum, in an oxygen-containing atmosphere) may be well-suited for such applications (noting again that the embrittlement layer is optional and may be included or omitted in various circumstances).

The thicknesses of the various layers can be chosen as desired. In various embodiments, the embrittlement layer may vary in thickness from e.g. 1, 2, 4 or 6 nm to 100, 80, 60, 40, 30 or 20 nm. In various embodiments, the reflecting layer may vary from e.g. 10, 20, 40 or 80 nm to 40, 20, 10, 7, 5, 4, 3, 2 or 1 microns. In various embodiments, the selective-bonding layer may vary from e.g. 20, 40 or 60 nm to 500, 400, 300, 200 or 100 nm. In various embodiments, the release layer may vary from e.g. 2, 4 or 6 nm to 40, 30 or 20 nm. In various embodiments, the support substrate may vary from e.g. 0.5, 1.0, 2, or 4 mils, to 20, 10, 6, 3, 1.5 or 0.6 mils.

In many convenient embodiments, a multilayer transfer stack 350 may be built starting with a support substrate 361 (e.g. biaxially-oriented polypropylene (BOPP)) that is provided with a release layer 362, e.g. a metal coating such as an aluminum coating) to thus provide a releasable support assembly 360. The remaining layers can then be sequentially deposited on the release-layer-bearing side of the support substrate, starting with the selective-bonding layer 303.

A process of the general type depicted in FIG. 7 will thus produce a reflective layer of the general type shown in FIG. 2. In such arrangements, embrittlement layer 302 will be in the retroreflected light path and will thus be chosen to ensure that it does not unacceptably affect the retroreflective performance. In some such embodiments the embrittlement layer is transparent to the retroreflected light. Often, such an embrittlement layer will be relatively thin (e.g. 50, 30, 20, or 10 nm or less). Although the exemplary depiction of FIG. 7 shows the releasable support assembly 360 being removed in-line with the lamination of the reflective layer 30 to the microsphere, in practice this removal may be performed later; for example, a set of carrier-borne microspheres with a transfer stack 350 disposed thereon, may be stored e.g. as a roll good with the releasable support assembly 360 being released and removed at a later time.

It will be appreciated that such an approach, if used to form a first locally-laminated layer 30, results in the rearmost surface 33 of the thus-formed layer 30 being provided by the high-release major surface of selective-bonding layer 303 (which surface is exposed upon the above-described multilayer transfer stack being divided at interface 331 between selective-bonding layer 303 and release layer 362). Such an arrangement may thus provide a first layer 30 whose rearmost surface is a high-release layer, which may promote the previously-described circumstance in which a second locally-laminated layer does not bond to (e.g., does not remain in place rearward of), a first locally-laminated layer. In other words, such an approach may be useful in the performing of an annular-transfer lamination of a second locally-laminated layer.

Figure 8:
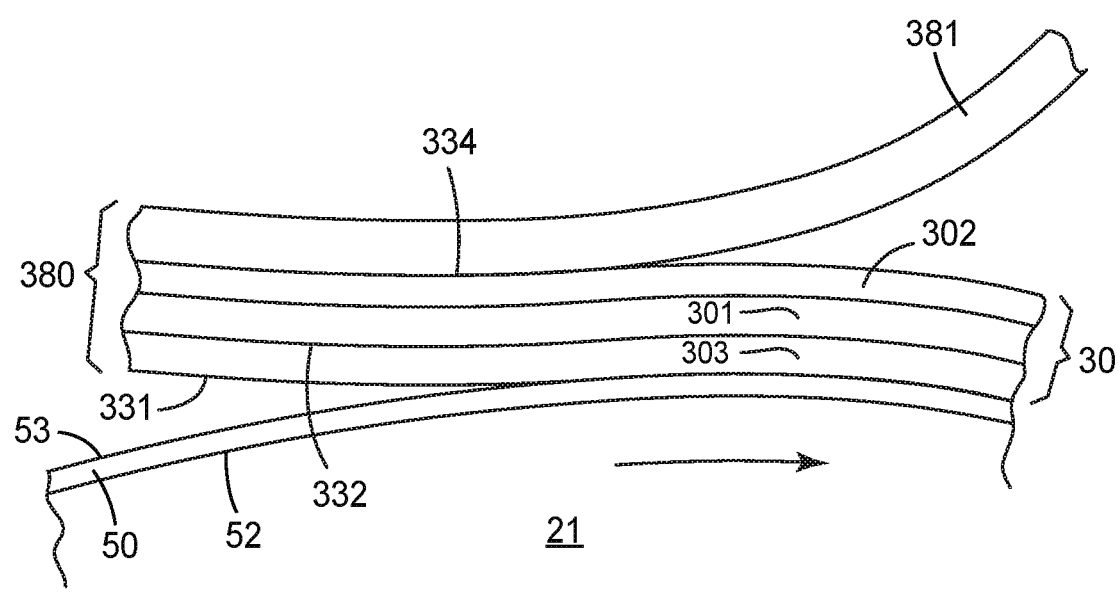
FIG. 8 is a side schematic cross sectional view of another exemplary process for locally laminating a layer to a portion of a protruding transparent microsphere.

As noted earlier, in some embodiments a functional (e.g. reflective) layer 30 may comprise an arrangement of the general type shown in FIG. 3, in which the position of embrittlement layer 302 and selective-bonding layer 303 are swapped from that shown in FIG. 2. Such arrangements may be obtained using a modified version of the lamination process described above, using a conformally-supported transfer stack 380 as shown in exemplary embodiment in FIG. 8. In such an approach, a preliminary assembly (not shown in FIG. 8) may be made that comprises a releasable support assembly of the general type described above. Onto the release layer of this assembly may be successively deposited a selective-bonding layer 303, a reflecting layer 301, and an embrittlement layer 302, to make the preliminary assembly. Such a preliminary assembly may then be laminated to a suitable conformal substrate 381 (described in detail below), with a major surface of embrittlement layer 302 in contact with a major surface of conformal substrate 381. The conformal substrate can be configured so that the bonding force between these two surfaces (at interface 334 of FIG. 8), and the bonding forces between the other layers, are all greater than the bonding force between the selective-bonding layer 303 and the release layer of the releasable support assembly. The releasable support assembly can thus be detached from the other layers to leave behind conformally-supported transfer stack 380 as shown in FIG. 8. In FIG. 8, the releasable support assembly has already been removed and is thus not shown; however, the number 331 indicates the position of the interface that previously existed between selective-bonding layer 303 and the release layer of the releasable support assembly. This approach thus uses the selective bonding/release properties of layer 303 to release a transfer stack from a preliminary assembly, in a preliminary step that occurs before the actual lamination of the reflective layer to the microsphere.

It is noted that the term conformal substrate is used for convenience to denote an entity (e.g. item 381 of FIG. 8) that is used in a local-lamination process, that does not remain as part of the retroreflective article, and that plays no further role after the local lamination. Such a conformal substrate is different from a substrate (e.g. item 130 of FIG. 6) to which a retroreflective article may be coupled.

The above-described preliminary process will thus produce a conformally-supported transfer stack 380 of the general type shown in FIG. 8. This transfer stack can then be brought in contact with a protruding portion of a transparent microsphere (i.e., in contact with a bonding layer 50 present thereon) to perform a local lamination process in the general manner described above. After performing the lamination, the conformal substrate 381 can be removed at any suitable time, either in-line with lamination or at some later time. This can be achieved by ensuring that the bonding force at interface 334 between the surface of conformal substrate 381 and embrittlement layer 302 (or reflecting layer 301 if no embrittlement layer is present) is less than the bonding force at all other interfaces. In such arrangements, selective-bonding layer 303 will be in the retroreflected light path and will thus be chosen to ensure that it does not unacceptably affect the retroreflective performance. In some such embodiments the selective-bonding layer is transparent to the retroreflected light.

The differences of the process (and resulting product) of FIG. 8 from the earlier-described process of FIG. 7 are several. First, the location of the selective-bonding layer 303 (and of the optional embrittlement layer 302, if present) relative to the retroreflective light path is different, as noted above. Also, the rearmost surface of the thus-formed layer may be a rear surface of an embrittlement layer 302 (if present) or a rear surface of a reflecting layer 301 in FIG. 8, rather than a high-release surface of a selective release layer. Such an arrangement may thus provide a first layer 30 whose rearmost surface is not a high-release layer, and thus may promote the previously-described circumstance in which a second locally-laminated layer does bond to (e.g., remains in place rearward of) a first locally-laminated layer. In other words, such an approach may be useful in the performing of a full-transfer lamination of a second locally-laminated layer.

Beyond this, the use of a conformal substrate 381 can allow a functional layer 30 or 530 (including all of its component layers) to be more aggressively locally conformed along the multi-dimensionally-curved surface of the transparent microsphere. In some embodiments, the use of a more aggressively conformable substrate 381 may produce a locally-laminated layer that exhibits a greater percent area coverage (e.g. that occupies a greater angular arc) of the embedded area of the microsphere. A local lamination process that uses a conformally-supported transfer stack may thus be advantageously used e.g. to provide a second locally-transferred layer that exhibits a greater area coverage of the microsphere (e.g. that is present as a spherical segment), in comparison to a first locally-transferred layer (e.g. that is present as a polar-cap). One arrangement that achieves this general type of behavior is demonstrated in Working Example 2 of the Working Example herein. However, as discussed later, there are various parameters and process conditions that can be manipulated in order to affect the percent area coverage of a locally-laminated layer; thus it is not necessarily required that a conformal substrate be used in order to achieve a high percent area coverage. In other words, the use of a conformal substrate is only one of several parameters that may be varied to promote a particular outcome.

Any sheet-like or film-like material (e.g. an organic polymeric sheet or film) that exhibits suitable conformability may be a possible candidate for a conformal substrate 381. Any such material will be chosen so that it is releasable from the surface of embrittlement layer 302 (or e.g. from the surface of reflecting layer 301 if an embrittlement layer 302 is not present) so that conformal substrate 381 can be separated therefrom after lamination of the functional layer to the microsphere. However, the material must also be chosen so that it bonds to either such layer more strongly than the bonding strength of the selective-bonding layer 303 to the release layer of the release assembly (so that the release assembly can be removed in the above-described preliminary step). Various organic polymeric materials may be suitable for fulfilling this role. For example, suitable materials may be chosen from styrene-isoprene rubber, styrene-butadiene rubber, butyl rubber, and so on. Some such materials may be chosen from styrenic-rubber block copolymers of the general type known as KRATON polymers, e.g. KRATON SIS (available from KRATON POLYMERS LLC; Houston, TX). In some embodiments, multilayer materials that comprise a highly-elastomeric core sandwiched between less-elastomeric skins comprised of polyolefin plastomers) have been found to be particularly suitable. In some embodiments a conformal substrate may be highly conformable along all dimensions (for example, it may not possess asymmetric mechanical properties of the type exhibited by some highly-oriented polymer films). In some embodiments, a conformal substrate may be configured to be elastically conformable. For example, the substrate may exhibit an elongation at break of at least 200, 400, or 600 percent, and may be a single-layer or multilayer construction as noted earlier herein. In various embodiments, such a substrate may be from e.g. 10, 20, 50, or 100 microns in thickness to 5000, 2000, 1000, 500, 400, or 200 microns in thickness.

The above-described local lamination of layers to protruding portions of transparent microspheres (whether by "direct" lamination of the general type shown in FIG. 7, or lamination that is assisted by a conformal substrate, in the general manner shown in FIG. 8) may be carried out in any suitable manner. In many convenient embodiments, it may be performed by bringing together carrier-borne microspheres and a multilayer transfer stack in a lamination nip between two backing rolls. The conditions under which this is performed may be varied as desired. In particular, the process conditions may be varied to affect the extent to which each layer contacts (e.g. "wraps around"), and transfers to, the protruding areas of the microspheres. This extent of coverage can be characterized e.g. by the previously-described angular arc, and is indicative of the extent to which the functional layer will cover the embedded area of the microsphere in the final retroreflective article.

It has already been noted that the presence or absence of a conformal substrate in the lamination process may affect the "wrap-around" of the microspheres that is achieved by the laminated layer (as manifested e.g. by the angular arc occupied by the laminated layer). It has also been found that the hardness of the first and second backing rolls that respectively support the carrier-borne microspheres and the transfer stack during lamination can be usefully adjusted. In some embodiments, one or both backing rolls may be hard-surfaced (e.g. one or both may comprise a metal surface such as steel), e.g. with a Rockwell Hardness (HRC) of at least 40. In some embodiments, one or both backing rolls may be soft-surfaced, e.g. with an elastomeric or rubberized coating (e.g. with a Shore A hardness of less than 100, 80, 70, 60, or 50). In instances in which one backing roll is hard-surfaced (e.g. steel) and the other is soft-surfaced (e.g. rubberized), best performance is typically obtained with the soft-surfaced roll supporting the transfer stack and the hard-surfaced roll supporting the carrier-borne microspheres.

The pressure with which the backing rolls are urged toward each other during the lamination process (e.g. from a low value of approximately 50 pounds per linear inch, to a moderate value of approximately 400 pounds per linear inch, to a high value of approximately 1700 pounds per linear inch) can also be manipulated, with higher pressures generally leading to higher area coverage of the microspheres by the thus-transferred layers, as expected. In general, the presence of a conformal substrate in the multilayer transfer stack was found to significantly lower the lamination pressure needed to achieve a given area coverage. Similarly, the use of a soft-surfaced backing roll may allow the lamination pressure to be lowered (although not necessarily to as large a degree as the use of a suitable conformal substrate in the multilayer transfer stack) and/or may provide a more macroscopically-uniform appearance of the resulting article.

General guidelines may thus be provided regarding the effect of the various processing parameters. Thus for example, in some embodiments a local lamination process, e.g. a first local lamination process, may be performed using hard-surfaced (e.g. steel) backing rolls, operating at a lamination pressure of approximately 800 pounds per linear inch (PLI). This may, in some circumstances, provide microspheres with first locally-laminated layers that are relatively small, e.g. polar-cap layers. The article outputted by this process may then be subjected to a similar process (again using two steel backing rolls), but operating at a higher pressure of e.g. approximately 1500 PLI. This second, more aggressive lamination may provide the microspheres with second locally-laminated layers that are relatively larger in area, e.g. that comprise spherical segments that at least partially encircle the first locally-laminated layers. Further details of such an approach are provided in Working Example 1.

In some embodiments a local lamination process, e.g. a first lamination process, may be performed with a soft-surfaced backing roll, e.g. a silicone-rubber-surfaced roll with a Shore A hardness of approximately 68. Thus for example, a soft-surfaced backing roll may be used at a lamination pressure of approximately 400-600 PLI. Further details of such approaches are exemplified e.g. in Working Example 2, in which a first local lamination was performed with a nip comprising a steel backing roll and a steel backing roll with a silicone-rubber sleeve with a Shore hardness of 68, operated at approximately 500 PLI, after which a second, more aggressive local lamination was performed using two steel backing rolls operating at approximately 1000 PLI.

In some embodiments, a local lamination process, e.g. a second local lamination process, may be performed using a conformally-supported transfer stack that relies on a conformal substrate. Further details of such approaches are exemplified e.g. in Working Example 3. In such cases, it has been found that locally-transferred layers that occupy relatively large angular arcs can be achieved, even at quite low lamination pressure (e.g., in the range of approximately 10-200 PLI).

It will be appreciated that the above arrangements are exemplary and, based on the disclosures herein, ordinary artisans will be able to manipulate the various parameters, including but not limited to the lamination pressure, character of the backing rolls of the lamination nip, presence or absence of a conformal support in a transfer stack used in the lamination, and so on, to manipulate the character of the lamination process e.g. to promote a desired arrangement of first and second locally-transferred functional layers, e.g. reflective layers.

It will be appreciated that the actual results of any real-life lamination process will be statistical and will not necessarily produce a perfectly uniform set of retroreflective elements. For example, in some instances it has been found that a second, more aggressive lamination step may dispose second locally-laminated layers onto transparent microspheres that (e.g. because the microspheres were smaller in diameter and/or were buried more deeply in the carrier web) had not received first locally-laminated layers in a first, less aggressive lamination step. The presence of some statistically small number of such microspheres bearing only locally-laminated layer (along with, in some circumstances, a number of microspheres that may not have received any locally-laminated layer at all) has not been found to unacceptably detract from the overall results disclosed herein.

Regardless of the exact nature of the processing steps, the arrangements described herein provide that a local area of a first pre-made functional layer can be bonded to a portion of a protruding area of a transparent microsphere with sufficient strength to allow this local area of the first layer to release (delaminate) from remaining layers of a multilayer transfer stack and also to allow this local area of the first layer to break away from the regions of the first layer that previously laterally surrounded this local area. Similar considerations hold for the second pre-made functional layer, noting that various parameters can be altered to modify the area coverage achieved by the second layer.

It has been found that various process conditions can also contribute to whether a second locally-laminated layer is disposed purely as a spherical segment around an existing first locally-laminated layer; or, is disposed so that a portion of the second layer remains in place rearward of the first layer. In other words, such arrangements can affect whether a second layer consists only of a spherical segment that is arranged in parallel to the first layer or also comprises a portion that is arranged in series with (rearward of) the first layer. In general, the nature of a rearmost surface of a first locally-laminated layer (as inherently exhibited by the layer itself, or as modified e.g. by a particular surface treatment) can affect tendency of the second layer to remain in place against the rear of the first layer. It has also been found that the nature of the second layer can affect this tendency. For example, the thickness and/or stiffness of the second layer may have an effect. In some instances, second layers that are thicker, stiffer, and/or harder to fracture or break may have more of a tendency to retain a portion in place rearward of the first layer. This may be true even if the second layer does not necessarily bond (strongly, or at all) to the first layer. Rather, a second layer that is sufficiently thick and strong, and that bonds to the areas of a microsphere not covered by a first layer, may retain a portion rearward of the first layer, even if that portion does not necessarily bond to the first layer. Thus in summary, the nature of a local lamination process (e.g. whether any given lamination of a second locally-laminated layer is an annular-transfer process or a full-transfer process) may be affected by the properties of the layer itself rather than being only a function of the process conditions. It will again be appreciated that such phenomena may be statistical in nature and that in any given circumstance, a variety of configurations may be present.

It is emphasized that many variations on the specific arrangements disclosed above are possible, and may be useful for particular applications. For examples, discussions heretofore have primarily concerned scenarios in which a first locally-laminated layer is relatively small (e.g., is present in a polar-cap configuration), and in which a second locally-laminated layer is relative large in comparison to the first layer (e.g., the second layer is present in a spherical segment that at least partially encircles the first layer). However, in some embodiments a first (e.g. forwardmost) layer might be larger and a second (e.g. rearwardmost) layer smaller. While such arrangements might provide little benefit e.g. if the first layer is a non-selective reflector such as silver or aluminum, in other embodiments the first layer might be a dielectric stack that preferentially reflects specific wavelengths (such as e.g. near-IR wavelengths). Light of other wavelengths (e.g. visible light) could be allowed to pass through the first layer to then be manipulated by a suitably-configured second layer. In embodiments of this general type, the rearward surface of the first layer could be treated or otherwise configured to enhance the ability of the second layer to bond to it, if desired.

Regardless of the particular arrangements, in some embodiments a suitable bonding layer can be used to locally bond a local area of a first or second layer to a protruding area of a transparent microsphere. In many embodiments, an intervening layer 50 as discussed elsewhere herein may be used as a bonding layer, as long as it exhibits suitable bonding properties. In various embodiments, a bonding layer may be any layer of organic polymeric material that is disposed at least atop the protruding areas of the microspheres and that can be processed (e.g. softened) sufficiently to allow a functional layer to be locally bonded thereto. In some embodiments such softening may occur by virtue of local pressure applied in the lamination process (since the lamination force will be concentrated on the actual portions of the microspheres that are contacted by the transfer stack). Thus in some embodiments it may not be necessary to provide an elevated temperature (e.g. by heating one or both of the backing rolls of the lamination nip) in order to perform the herein-disclosed local lamination. In such embodiments the lamination may be performed under ambient conditions, e.g. at a temperature in the range of approximately 20-22° C. In other embodiments, it may be helpful to perform the lamination at an elevated temperature.

In some embodiments, a bonding layer may be provided by a layer of organic polymeric material (e.g. an intervening layer) that is disposed atop at least portions of the protruding areas of carrier-borne transparent microspheres and that is configured so that under appropriate lamination conditions a functional layer may be locally bonded thereto. Some such intervening layers may serve some other purpose, e.g. they may serve as a protective layer that e.g. provides abrasion resistance, corrosion resistance, or the like. Protective layers that can serve as bonding layers, and compositions thereof, are described in detail in U.S. Patent Application Publication No. 2017/0276844, which is incorporated by reference in its entirety herein. In particular embodiments, such a layer may be comprised of a polyurethane material. Various polyurethane materials that may be suitable for such purposes are described e.g. in U.S. Patent Application Publication No. 2017/0131444, which is incorporated by reference in its entirety herein.

In some embodiments, a bonding layer may be used that exhibits pressure-sensitive adhesive properties e.g. at room temperature. Such approaches may provide that the local lamination process may be performed with relatively low laminating pressures. In some such embodiments, such a pressure-sensitive adhesive may be disposed atop at least a portion of the protruding areas of the carrier-borne microspheres to form a localized bonding layer, e.g. by a transfer process such as e.g. flexographic printing of an adhesive precursor. In some particular embodiments of this type, such a bonding layer (e.g. a flexographically-printed bonding layer) may include a colorant. Thus, such a layer may serve as a localized color layer as described earlier herein, and may also serve as a bonding layer for a locally-laminated layer.

In various embodiments, such a bonding layer, if it is a separate layer from an aforementioned localized color layer, may be disposed atop the carrier-borne transparent microspheres after the localized color layer is disposed thereon. It will be understood that a local lamination process encompasses physical transfer of a functional layer to a protruding area of a transparent microsphere, regardless of what layer (s) may already be present on the protruding area of the microsphere.

In some embodiments, such a bonding layer may be present in a continuous manner (e.g. including portions that are present on the front side of the retroreflective article as with layer 50 in the exemplary arrangement of FIG. 1). In other embodiments, such a bonding layer may be a discontinuous bonding layer that is present only in the local area of the protruding area of transparent microspheres that it is desired to laminate a functional layer to. Such a discontinuous bonding layer may be locally provided e.g. by flexographic printing or the like.

It is noted that even if a bonding layer is continuous rather than discontinuous, the lamination process may be performed so that the (first or second) pre-made, functional layer only contacts (and thus transfers to) the areas of the bonding layer that are actually contacted by the reflective layer.

After formation of the first and second locally-laminated layers is carried out, a binder can be disposed on microsphere-bearing carrier layer 110. In some embodiments this can be performed by disposing a binder precursor (e.g., a mixture or solution of binder layer components) to microsphere-bearing carrier layer 110. The binder precursor may be disposed, e.g. by coating, onto the microsphere-loaded carrier layer and then hardened to form a binder layer, e.g. a continuous binder layer. The binder may be of any suitable composition, e.g. it may be formed from a binder precursor that comprises an elastomeric polyurethane composition along with any desired additives, etc. Binder compositions, methods making binders from precursors, etc., are described in U.S. Patent Application Publication Nos. 2017/0131444 and 2017/0276844, which are incorporated by reference in their entirety herein. Binders, compositions thereof, and methods of making binders may also be chosen from those described in U.S. Provisional Application No. 62/522,279 and corresponding PCT International Patent Application No. US2018/038160; U.S. Provisional Application No. 62/527, 090 and corresponding PCT International Patent Application No. IB2018/054778; U.S. Provisional Application No. 62/785,326; and U.S. Provisional Application No. 62/785, 344, all of which are incorporated by reference herein in their entirety.

In general, binder layer 10 is configured to support transparent microspheres 21 and is typically a continuous, fluid-impermeable, sheet-like layer. In various embodiments, binder layer 10 may exhibit an average thickness of from 1 to 250 micrometers. In further embodiments, binder layer 10 may exhibit an average thickness of from 30 to 150 micrometers. Binder layer 10 may include polymers that contain units such as urethane, ester, ether, urea, epoxy, carbonate, acrylate, acrylic, olefin, vinyl chloride, amide, alkyd, or combinations thereof. A variety of organic polymer-forming reagents can be used to make the polymer. Polyols and isocyanates can be reacted to form polyurethanes; diamines and isocyanates can be reacted to form polyureas; epoxides can be reacted with diamines or diols to form epoxy resins, acrylate monomers or oligomers can be polymerized to form polyacrylates; and diacids can be reacted with diols or diamines to form polyesters or polyamides. Examples of materials that may be used in forming binder layer 10 include for example: Vitel™ 3550 available from Bostik Inc., Middleton, MA.; Ebecryl™ 230 available from UBC Radcure, Smyrna, GA.; Jeffamine™ T-5000, available from Huntsman Corporation, Houston, TX; CAPA 720, available from Solvay Interlox Inc., Houston TX; and Acclaim™ 8200, available from Lyondell Chemical Company, Houston, TX.

In some embodiments binder layer 10 may be at least generally visibly transmissive (e.g. transparent). In many convenient embodiments binder layer 10 may comprise one or more colorants. In particular embodiments a binder may comprise one or more fluorescent pigments. Suitable colorants (e.g. pigments) may be chosen e.g. from those listed in the above-cited '444 and '844 Publications.

In some embodiments, binder layer 10 may contain reflective particles, e.g. flakes, of reflective material (e.g. nacreous or pearlescent material), so that at least a portion of binder layer 10 that is adjacent to transparent microsphere 21 can function as a secondary reflective layer. By a "secondary" reflective layer is meant a layer of binder layer 10 that serves to enhance the performance of a retroreflective element above the performance provided by first and/or second locally-laminated reflective layers 30 and/or 530 that cover an area 28 of a transparent microsphere. Such a "secondary" reflective layer by definition is not a locally-laminated layer and is thus distinguished from the previously-described first and second locally-laminated reflective layers. In many embodiments, such a secondary reflective layer may mainly operate adjacent a portion (e.g. portion 27 as shown in FIG. 6) of embedded area 25 of the transparent microsphere 21 that is not covered by a first or second locally-laminated reflective layer 30 or 530. Such a secondary reflective layer (which may not necessarily have a well-defined rearward boundary) may provide at least some retroreflection due to the aggregate effects of the reflective particles that are present in the layer. Secondary reflective layers are described in detail in U.S. Provisional Patent Application No. 62/739,529 and in PCT International Patent Application No. US2018/057558, both of which are incorporated by reference herein in their entirety.

Discussions herein have primarily concerned articles of the general types shown e.g. in FIGS. 1 and 6 (including a binder layer, and in the form of e.g. a transfer article). However, in some embodiments the arrangements disclosed herein, comprising layers 30 and 530 or their equivalents, may be provided in an article that does not comprise a binder layer. Such an article will be termed an "intermediate" article for convenience of description. As shown in exemplary embodiment in FIG. 9, in embodiments of this type, an intermediate article 1000 may take the form of a carrier layer 110 bearing transparent microspheres 21 on a first surface 112 thereof, without any binder layer being present. (However, transparent microspheres 21 may be protected e.g. by a removable cover film provided on the microsphere-bearing side of the carrier layer, if desired.) Such an intermediate article will comprise at least some transparent microspheres 21 that comprise protruding areas 25 on portions 28 of which are provided locally-laminated layers 30 and 530.

In some embodiments first layers 30 and/or second layers 530 may form embedded layers in the final article. However, strictly speaking, any such layers will not be "embedded" layers until a binder layer 10 is present. So, in embodiments of this particular type, such layers will be equivalently characterized as being "isolated" layers, meaning that they cover a portion, but do not cover the entirety of, the protruding areas 25 of the microspheres. The various characterizations of locally-laminated layers in terms of coverage of the microspheres, angular arcs, and so on, will be understood to be applicable in similar manner to isolated layers in intermediate articles in which a binder layer has not yet been disposed to form the final article.

In some embodiments, an intermediate article may comprise an intervening layer 50 of the general type described elsewhere herein. Other layers (e.g. color layers) may be included in the intermediate article as desired.

An intermediate article, comprising transparent microspheres with locally-laminated, isolated layers thereon, can be further processed in any desired manner. In some embodiments, a binder layer e.g. comprising any desired colorant may be disposed onto the microsphere-bearing carrier layer in order to form an article 1. Intermediate articles of any suitable configuration may be shipped to customers who may, for example, dispose binder layers thereon to form customized articles.

Discussions herein have primarily concerned retroreflective articles in which areas 24 of microspheres 21 that are exposed (i.e., that protrude) forwardly of binder layer 10, are exposed to an ambient atmosphere (e.g., air) in the final retroreflective article as used. In other embodiments, the exposed areas 24 of microspheres 21 may be covered by, and/or reside within, a cover layer that is a permanent component of article 1. Such articles will be termed encapsulated-lens retroreflective articles. In such cases, the transparent microspheres may be chosen to comprise a refractive index that performs suitably in combination with the refractive index of the cover layer. In various embodiments, in an encapsulated-lens retroreflective article, the microspheres 21 may comprise a refractive index (e.g. obtained through the composition of the material of the microspheres, and/or through any kind of surface coating present thereon) that is at least 2.0, 2.2, 2.4, 2.6, or 2.8. In some embodiments, a cover layer of an encapsulated-lens retroreflective may comprise sublayers. In such cases, the refractive indices of the microspheres and the sublayers may be chosen in combination.

In some embodiments, such a cover layer may be a transparent layer. In other embodiments, the entirety, or selected regions, of a cover layer may be colored (e.g. may include one or more colorants) as desired. In some embodiments, a cover layer may take the form of a pre-existing film or sheet that is disposed (e.g. laminated) to at least selected areas of the front side of article 1. In other embodiments, a cover layer may be obtained by printing, coating or otherwise depositing a cover layer precursor onto at least selected areas of the front side of article 1, and then transforming the precursor into the cover layer.

As noted earlier herein, in some embodiments a color layer may be present that may perform wavelength-selective absorption of electromagnetic radiation at least somewhere in a range that includes visible light and infrared radiation, by the use of a colorant that is disposed in the color layer. Alternatively, or in addition, a colorant may be disposed in binder layer 10. The term colorant broadly encompasses pigments and dyes. Conventionally, a pigment is considered to be a colorant that is generally insoluble in the material in which the colorant is present and a dye is considered to be a colorant that is generally soluble in the material in which the colorant is present. However, there may not always be a bright-line distinction as to whether a colorant behaves as a pigment or a dye when dispersed into a particular material. The term colorant thus embraces any such material regardless of whether, in a particular environment, it is considered to be a dye or a pigment. Suitable colorants are described and discussed in detail in the aforementioned U.S. Provisional Patent Application 62/675,020.

Transparent microspheres 21 as used in any article disclosed herein may be of any suitable type. In this particular context, the term "transparent" is generally used to refer to a body (e.g. a glass microsphere) or substrate that transmits at least 50% of electromagnetic radiation at a selected wavelength or within a selected range of wavelengths. In some embodiments, the transparent microspheres may transmit at least 75% of light in the visible light spectrum (e.g., from about 400 nm to about 700 nm); in some embodiments, at least about 80%; in some embodiments, at least about 85%; in some embodiments, at least about 90%; and in some embodiments, at least about 95%. In some embodiments, the transparent microspheres may transmit at least 50% of radiation at a selected wavelength (or range) in the near infrared spectrum (e.g. from 700 nm to about 1400 nm). In various embodiments, transparent microspheres may be made of e.g. inorganic glass, and/or may have a refractive index of e.g. from 1.7 to 2.0. (As noted earlier, in encapsulated-lens arrangements, the transparent microspheres may be chosen to have a higher refractive index as needed.) In various embodiments, the transparent microspheres may have an average diameter of at least 20, 30, 40, 50, 60, 70, or 80 microns. In further embodiments, the transparent microspheres may have an average diameter of at most 200, 180, 160, 140 120, 100, 80, or 60 microns. The vast majority (e.g. at least 90% by number) of the microspheres may be at least generally, substantially, or essentially spherical in shape. However, it will be understood that microspheres as produced in any real-life, large-scale process may comprise a small number of microspheres that exhibit slight deviations or irregularities in shape. Thus, the use of the term "microsphere" does not require that these items must be e.g. perfectly or exactly spherical in shape.

U.S. Patent Application Publication Nos. 2017/0276844 and 2017/0293056, which are incorporated by reference in their entirety herein, discuss methods of characterizing retroreflectivity according to e.g. a coefficient of retroreflectivity ($R_A$). In some embodiments, at least selected areas of retroreflective articles as disclosed herein may exhibit a coefficient of retroreflectivity, measured (at 0.2 degrees observation angle and 5 degrees entrance angle) in accordance with the procedures outlined in these Publications, of at least 20, 50, 100, 200, 250, 350, or 450 candela per lux per square meter. In some embodiments, the $R_A$ may be highest when measured with a "head-on" entrance angle (e.g. 5 degrees). In other embodiments, the $R_A$ may be highest when measured with a "glancing" entrance angle (e.g. 30, 40, or 50 degrees, or even 88.76 degrees).

In various embodiments, retroreflective articles as disclosed herein may meet the requirements of ANSI/ISEA 107-2015 and/or ISO 20471:2013 for minimum retroreflective coefficient performance at specific combinations of entrance and observation angle, such as the "32-angle" test battery of the type described in Table 5 of ISO 20471:2013 used in the evaluation of e.g. safety apparel. In many embodiments, retroreflective articles as disclosed herein may exhibit satisfactory, or excellent, wash durability. Such wash durability may be manifested as high $R_A$ retention (a ratio between $R_A$ after wash and $R_A$ before wash) after numerous (e.g. 25) wash cycles conducted according to the method of ISO 6330 2A, as outlined in U.S. Patent Application Publication No. 2017/0276844. In various embodiments, a retroreflective article as disclosed herein may exhibit a percent of $R_A$ retention of at least 30%, 50%, or 75% after 25 such wash cycles. In various embodiments, a retroreflective article as disclosed herein may exhibit any of these retroreflectivity-retention properties in combination with an initial $R_A$ (before washing) of at least 100 or 330 candela per lux per square meter, measured as noted above.

A retroreflective article as disclosed herein may be used for any desired purpose. In some embodiments, a retroreflective article as disclosed herein may be configured for use in or with a system that performs e.g. machine vision, remote sensing, surveillance, or the like. In particular, in many embodiments the herein-disclosed arrangements can provide a retroreflective article in which the wavelength dependence of the retroreflectivity changes with the entrance angle, in a manner (e.g. to an extent) not possible with e.g. conventional uniformly-reflectorized microspheres. Such behavior may be very advantageous for e.g. machine vision systems. Any such a machine vision system may rely on, for example, one or more visible and/or near-infrared (IR) image acquisition systems (e.g. cameras) and/or radiation or illumination sources, along with any other hardware and software needed to operate the system. Thus in some embodiments, a retroreflective article as disclosed herein (whether or not it is mounted on a substrate) may be a component of, or work in concert with, a machine vision system of any desired type and configuration. Such a retroreflective article may, for example, be configured to be optically interrogated (whether by a visual-wavelength or near-infrared camera, e.g. at a distance of up to several meters, or even up to several hundred meters) regardless of the ambient light conditions. Thus in various embodiments, such a retroreflective article may comprise retroreflective elements configured to collectively exhibit any suitable image(s), code(s), pattern, or the like, that allow information borne by the article to be retrieved by a machine vision system. Exemplary machine vision systems, ways in which retroreflective articles can be configured for use in such systems, and ways in which retroreflective articles can be characterized with specific regard to their suitability for such systems, are disclosed in U.S. Provisional Patent Application No. 62/536,654, which is incorporated by reference in its entirety herein.

In some embodiments, locally-laminated layers (e.g. reflective layers), color layers, and so on, may be provided in various macroscopic areas of a retroreflective article rather than collectively occupying the entirety of the article. Such arrangements can allow images to be visible in retroreflected light (whether such images stand out by way of increased retroreflectivity and/or by way of an enhanced color). In some embodiments, such images may be achieved e.g. by performing patterned deposition of locally-laminated reflective layers e.g. by the use of a patterned laminating roll or a patterned conformable substrate in the lamination process. In various embodiments a retroreflective article as disclosed herein may be configured to exhibit images when viewed in retroreflected light, to exhibit images when viewed in ambient light, or both. If both are present, the images when viewed in ambient light may be generally the same as those when viewed in retroreflected light (e.g. an article may convey the same information under both conditions); or the images may be different (e.g. so that different information is conveyed in ambient light versus in retroreflected light).

Various components of retroreflective articles (e.g. transparent microspheres, binder layers, reflective layers, etc.), methods of making such components and of incorporating such components into retroreflective articles in various arrangements, are described e.g. in U.S. Patent Application Publication Nos. 2017/0131444, 2017/0276844, and 2017/0293056, and in U.S. Provisional Patent Application No. 62/578,343, all of which are incorporated by reference in their entirety herein.

It will be appreciated that retroreflective elements comprising first and second locally-laminated layers as disclosed herein, can be used in any retroreflective article of any suitable design and for any suitable application. In particular, it is noted that the requirement of the presence of retroreflective elements comprising transparent microspheres (along with one or more color layers, reflective layers, etc.) does not preclude the presence, somewhere in the article, of other retroreflective elements (e.g. so-called cube-corner retroreflectors) that do not comprise transparent microspheres.

Although discussions herein have mainly concerned use of the herein-described retroreflective articles with garments and like items, it will be appreciated that these retroreflective articles can find use in any application, as mounted to, or present on or near, any suitable item or entity. Thus, for example, retroreflective articles as disclosed herein may find use in pavement marking tapes, road signage, vehicle marking or identification (e.g. license plates), or, in general, in reflective sheeting of any sort. In various embodiments, such articles and sheeting comprising such articles may present information (e.g. indicia), may provide an aesthetic appearance, or may serve a combination of both such purposes.

Exemplary Embodiments

The disclosures presented herein include, but are not limited to, the following exemplary embodiments, arrangements and combinations.

Embodiment 1 is a retroreflective article comprising: a binder layer; and, a plurality of retroreflective elements spaced over a length and breadth of a front side of the binder layer, each retroreflective element comprising a transparent microsphere partially embedded in the binder layer so as to exhibit an embedded area of the transparent microsphere; wherein at least some of the retroreflective elements each comprise a first locally-laminated layer that is embedded between the transparent microsphere and the binder layer; and, a second locally-laminated layer that is embedded between the transparent microsphere and the binder layer.

Embodiment 2 is the retroreflective article of embodiment 1 wherein the first locally-laminated, embedded layer and/or the second locally-laminated, embedded layer is a reflective layer. Embodiment 3 is the retroreflective article of embodiment 2 wherein the first locally-laminated, embedded layer is a first reflective layer and wherein the second locally-laminated, embedded layer is a second reflective layer. Embodiment 4 is the retroreflective article of any of embodiments 1-3 wherein at least 50 percent of the retroreflective elements of the retroreflective article each comprise a first locally-laminated, embedded reflective layer and/or a second locally-laminated, embedded reflective layer.

Embodiment 5 is the retroreflective article of any of embodiments 3-4 wherein at least some of the first locally-laminated, embedded reflective layers are localized layers and at least some of the second locally-laminated, embedded reflective layers are localized layers.

Embodiment 6 is the retroreflective article of any of embodiments 1-5 wherein for at least some of the microspheres on which the first and second locally-laminated, embedded layers are present, at least a portion of the second locally-laminated, embedded layer is positioned in parallel to the first locally-laminated, embedded layer so that incoming light rays can reach the in-parallel portion of the second locally-laminated, embedded layer without having to pass through any portion of the first locally-laminated, embedded layer.

Embodiment 7 is the retroreflective article of any of embodiments 1-6 wherein for at least some of the microspheres on which the first and second locally-laminated, embedded layers are present, at least a portion of the second locally-laminated, embedded reflective is positioned rearward of, and in series with, the first locally-laminated, embedded layer, so that incoming light rays have to pass through the first locally-laminated, embedded layer to reach the in-series portion of the second locally-laminated, embedded layer.

Embodiment 8 is the retroreflective article of any of embodiments 1-7 wherein for microspheres on which the first and second locally-laminated, embedded layers are present, the first and second locally-laminated, embedded layers each occupy an angular arc of at most 180 degrees. Embodiment 9 is the retroreflective article of any of embodiments 1-8 wherein for at least some of the microspheres on which the first and second locally-laminated, embedded layers are present, the first locally-laminated, embedded layer occupies an angular arc of less than 40 degrees and the second locally-laminated, embedded layer occupies an angular arc of greater than 60 degrees.

Embodiment 10 is the retroreflective article of any of embodiments 1-9 wherein at least some of the locally-laminated, embedded layers each comprise a selective-bonding layer. Embodiment 11 is the retroreflective article of any of embodiments 1-10 wherein at least some of the locally-laminated, embedded layers each comprise an embrittlement layer.

Embodiment 12 is the retroreflective article of any of embodiments 1-11 wherein at least some of the locally-laminated, embedded layers are reflective layers that each comprise a metal reflecting layer. Embodiment 13 is the retroreflective article of any of embodiments 1-12 wherein at least some of the locally-laminated, embedded layers are wavelength-selective reflective layers that exhibit a predetermined wavelength of peak reflection. Embodiment 14 is the retroreflective article of any of embodiments 1-13 wherein the first locally-laminated, embedded layers are first reflective layers that each comprise a metal reflecting layer, and wherein the second locally-laminated, embedded layers are wavelength-selective reflective layers that exhibit a predetermined wavelength of peak reflection. Embodiment 15 is the retroreflective article of any of embodiments 1-13 wherein the first locally-laminated, embedded layers are first wavelength-selective reflective layers that exhibit a first predetermined wavelength of peak reflection; and, wherein the second locally-laminated, embedded layers are second wavelength-selective reflective layers that exhibit a second predetermined wavelength of peak reflection and wherein the second predetermined wavelength of peak reflection differs from the first predetermined wavelength of peak reflection by at least 50 nm.

Embodiment 16 is the retroreflective article of any of embodiments 1-15 wherein at least the second locally-laminated, embedded layers are reflective layers, and wherein the first locally-laminated, embedded layers and the second locally-laminated, embedded reflective layers are configured so that at least at one wavelength between 400 nm and 700 nm, the retroreflective article exhibits a percent retroreflectance at a 30 degree entrance angle, that is greater than a percent reflectance exhibited at a 5 degree entrance angle, by at least 2 percent.

Embodiment 17 is the retroreflective article of any of embodiments 1-16 wherein at least some of the retroreflective elements comprise an intervening layer at least a portion of which is disposed between the transparent microsphere and the binder layer so that the first locally-laminated, embedded layer, and the second locally-laminated, embedded layer, are positioned rearward of the intervening layer, between the intervening layer and the binder layer.

Embodiment 18 is the retroreflective article of any of embodiments 1-17 wherein the binder layer comprises a colorant.

Embodiment 19 is a transfer article comprising the retroreflective article of any of embodiments 1-18 and a disposable carrier layer on which the retroreflective article is detachably disposed with at least some of the transparent microspheres in contact with the disposable carrier layer. Embodiment 20 is a substrate comprising the retroreflective article of any of embodiments 1-18, wherein the binder layer of the retroreflective article is coupled to the substrate with at least some of the retroreflective elements of the retroreflective article facing away from the substrate.

Embodiment 21 is an intermediate article comprising: a disposable carrier layer with a major surface; a plurality of transparent microspheres partially embedded in the disposable carrier layer so that the transparent microspheres exhibit protruding surface areas; wherein at least some of the transparent microspheres each comprise a first locally-laminated, isolated layer that is present on a portion of the protruding surface area of the transparent microsphere and a second locally-laminated, isolated layer that is present on a portion of the protruding surface area of the transparent microsphere. Embodiment 22 is the intermediate article of embodiment 21 where the first locally-laminated, isolated layer is a reflective layer and the second locally-laminated, isolated layer is a reflective layer.

Embodiment 23 is a method of making an intermediate article comprising a plurality of transparent microspheres at least some of which comprise first and second pre-made, locally-laminated, isolated layers, the method comprising the steps of: bringing areas of a first pre-made layer into contact with portions of protruding areas of at least some transparent microspheres that are borne by a carrier layer and that are partially embedded therein; physically transferring the areas of the first pre-made layer to the portions of the protruding areas of the transparent microspheres with which the areas of the first pre-made layer are in contact, so that the transferred areas of the first pre-made layer are bonded to the portions of the protruding areas of the transparent microspheres; wherein during the physically transferring process the physically transferred areas of the first pre-made layer are detached from regions of the first pre-made layer that previously laterally surrounded the physically transferred areas; followed by the steps of: bringing areas of a second pre-made layer into contact with portions of protruding areas of at least some transparent microspheres bearing first locally-laminated, isolated layers, that are borne by a carrier layer and that are partially embedded therein; physically transferring the areas of the second pre-made layer to the portions of the protruding areas of the transparent microspheres with which the areas of the second pre-made layer are in contact, so that the transferred areas of the second pre-made layer are bonded to the portions of the protruding areas of the transparent microspheres bearing the first locally-laminated, isolated layers; wherein during the physically transferring process the physically transferred areas of the second pre-made layer are detached from regions of the second pre-made layer that previously laterally surrounded the physically transferred areas. Embodiment 24 is the method of embodiment 23 wherein the first locally-laminated, isolated layer and/or the second locally-laminated isolated layer is a reflective layer.

Embodiment 25 is a method of making a retroreflective article from an intermediate article of any of embodiments 21-22, the method comprising: disposing a binder precursor on the carrier layer and on the protruding areas of the transparent microspheres bearing the first and second locally-laminated, isolated layers; and, solidifying the binder precursor to form a retroreflective article comprising a binder layer and in which the first and second locally-laminated, isolated layers are embedded between the transparent microspheres and the binder layer.

Examples

Materials, preparation methods and test methods used in the following Examples generally followed those used in U.S. Provisional Patent Application No. 62/739,506 and PCT International Application No. US2018/057553. It is also noted that the Working Examples presented in those applications, although being directed to single locally-laminated layers rather than to multiple locally-laminated layers as in the present case, further illustrate the lamination methods relied on in the present case, and contain further discussions of the characterization (and, in particular, the appearance e.g. when viewed via either optical microscope or scanning electron microscope) of locally-laminated layers. For all these reasons, the '506 application and the '553 application are incorporated by reference herein in their entirety.

Test Methods

Coefficient of Retroreflection

Coefficients of reflection ($R_A$ at an observation angle of 0.2° and an entrance angle of 5°) and color coordinates in ambient light conditions (Y, x, y) followed the same test methods as described in the above-cited '506 application. In some cases, samples were evaluated in a "32-angle" test battery of the type described in Table 5 of ISO 20471:2013 (and also referred to in ANSI/ISEA 107-2015) and often used in the evaluation of e.g. safety apparel.

Retroreflective Spectrum Measurement

Radiometric properties of retroreflective light of a retroreflective material was measured with an Ocean Optics Spectrometer (model FLAME-S-VIS-NIR), a light source (model HL-2000-FHSA), and a reflectance probe (model QR400-7-VIS-BX) over a geometry of an observation angle of 0.2° and an entrance angle of 5°, 20°, 30°, or 40°, at an integration time of 4 milliseconds on a sample area with 0.5 inch diameter. The retroreflective light was calibrated against a sheet of 3M™ Diamond Grade™ DG3 Prismatic Digital Sheeting 4090DS (White) at an observation angle of 0.2° and an entrance angle of 5°. The retroreflective spectrum was shown by percentage of reflectivity (Retroreflective R %) over a wavelength range from 400 to 1000 nanometers.

Preliminary Articles and Methods of Making

Method for Making Temporary Bead Carrier Containing Glass Microspheres

The making of a temporary carrier sheet bearing transparent microspheres followed the same general process as outlined in the "Method for Making Temporary Bead Carrier containing Glass Microspheres" section of the '506 application. Disposing an organic polymeric layer on the microsphere-bearing carrier followed the same general process as described in the first paragraph of Working Example 2.3.1.D (Part D) of the '506 application. The resulting article is referred to as a Polymer Coated Bead Carrier.

Method for Making MultiLayer Transfer Stacks Comprising Reflective Layers

The making of transfer stacks comprising reflective layers in the form of dielectric stacks followed the same general process as described in Working Example 2.3.3.A (Part A) of the '506 application. Two such transfer stacks were made, one (designated R3502-5) comprising a dielectric-stack reflective layer that targeted at a wavelength of maximum reflection in the visible range, the other (designated R3512) comprising a dielectric stack reflective layer that targeted a wavelength of maximum reflection in the near-IR range. (These items may be referred to herein for convenience by the shorthand of visible-reflective and near-IR reflective.) The configurations of these two transfer stacks are shown in Tables 1 and 2. In these tables, all sublayer thicknesses are nominal targets based on deposition rate measurements or estimations; also, sublayers listed in these and other tables as "acrylate release" correspond to sublayers of the general type designated as "Acrylate-1" in the above-cited '506 and '553 application.

TABLE 1

Transfer Stack R3502-5
Visible dielectric transfer reflector R3502-5:

| | |
|---|---|
| 59 nm NbOx <br> 90.5 nm SiAlOx <br> 59 nm NbOx | 0.264 um <br> visible dielectric <br> reflective layer |
| 55 nm acrylate release | |
| SiAl release layer | |
| 7 mil PET substrate | |

TABLE 2

Transfer Stack R3512
Near-IR dielectric transfer reflector R3512:

| | |
|---|---|
| 102 nm NbOx <br> 159 nm acrylate <br> 102 nm NbOx <br> 159 nm acrylate <br> 102 nm NbOx <br> 159 nm acrylate release | 0.783 um <br> near-IR dielectric <br> reflective layer |
| SiAl release layer | |
| 5 mil PET substrate | |

Comparative Examples

Comparative Example 1 was made by laminating Transfer Stack R3502-5 to the Polymer Coated Bead Carrier. The lamination was performed using a pair of 16 inch diameter smooth-faced steel rolls, at a line speed of 3 feet per minute (fpm) and with a lamination pressure of 1000 pounds per linear inch (PLI) (these and all other laminations were performed at ambient temperature unless noted). The reflective layer of the Transfer Stack appeared to bond well to the organic polymer layer present on the protruding surfaces of the beads, and to separate from the surrounding reflective layer, so as to achieve the herein-described local lamination. After the lamination process, both the un-transferred reflective layer and the sacrificial layers of the Transfer Stack (comprising the SiAl release layer and the PET substrate) were removed from the microsphere-bearing carrier. A binder layer was then formed on the microsphere-bearing carrier, in generally similar manner as for Working Example 2.4.1 Part C of the '506 application. For convenience, the temporary carrier sheet was usually left in place on the article until such time as the article was to be tested, at which time the carrier sheet was removed and discarded. The resulting retroreflective article, which targeted retroreflectivity in the visible wavelength range, was designated as Comparative Example 1.

Comparative Example 2 was made in similar manner as Comparative Example 1, except using Transfer Stack R3512. Lamination conditions were the same. The retroreflective article, which targeted retroreflectivity in the near-IR wavelength range, was designated as Comparative Example 2.

Working Example 1

In a first lamination procedure, a first Transfer Stack (R3512, comprising the near-IR reflective layer) was laminated to the Polymer Coated Bead Carrier. Lamination was performed using the pair of 16 inch diameter smooth-faced steel rolls, at a line speed of 3 feet per minute and with a lamination pressure of 800 pounds per linear inch (PLI). After the first lamination process, both the un-transferred reflective layer and the sacrificial layers of the Transfer Stack were removed from the microsphere-bearing carrier. The resulting article was then subjected to a second, subsequent lamination procedure.

In the second, subsequent lamination procedure, a second Transfer Stack (R3502-5, comprising the visible reflective layer) was laminated to the above-described product of the first lamination procedure. This lamination was performed using the pair of 16 inch diameter smooth-faced steel rolls, at a line speed of 3 feet per minute and with a lamination pressure of 1500 pounds per linear inch (PLI). After the lamination process, both the un-transferred reflective layer and the sacrificial layers of the Transfer Stack were removed from the microsphere-bearing carrier. A binder layer was then formed on the microsphere-bearing carrier, in generally similar manner as for Working Example 2.4.1 Part C of the '506 application. For convenience, the temporary carrier sheet was usually left in place on the article until such time as the article was to be tested, at which time the carrier sheet was removed and discarded.

The resulting retroreflective article was designated as Working Example 1. Working Example 1 was believed to comprise a majority of transparent microspheres on which were disposed first, near-IR-reflective layers in a relatively small, polar-cap configuration resulting from the first, relatively low-pressure lamination process. The majority of transparent microspheres also appeared to have disposed on them, second, visible-light-reflective layers, resulting from the second, more aggressive (higher pressure) lamination process. The second, visible reflective layers were believed to be present as relatively large spherical segments that at least generally circumscribed the first, near-IR-reflective polar-cap layers. It appeared that in most cases, the second reflective layers did not significantly bond to the exposed rearward surfaces of the first reflective layers and did not remain in place rearward of the first reflective layers. In other words, it appeared that under these particular conditions, the second reflective layers were present primarily as spherical segments positioned in-parallel to the first reflective layers, without the second reflective layers appearing to have significant portions positioned in-series to the first reflective layers.

Retroreflectance of Working Example 1 Versus Comparative Examples 1 and 2

Retroreflective spectra (Retroreflective R % as a function of wavelength and as a function of entrance angle of the incident light) were obtained by the procedure outlined above, for Comparative Examples 1 and 2 and for Working Example 1. The respective results are shown in FIGS. 10, 11 and 12.

Figure 10:
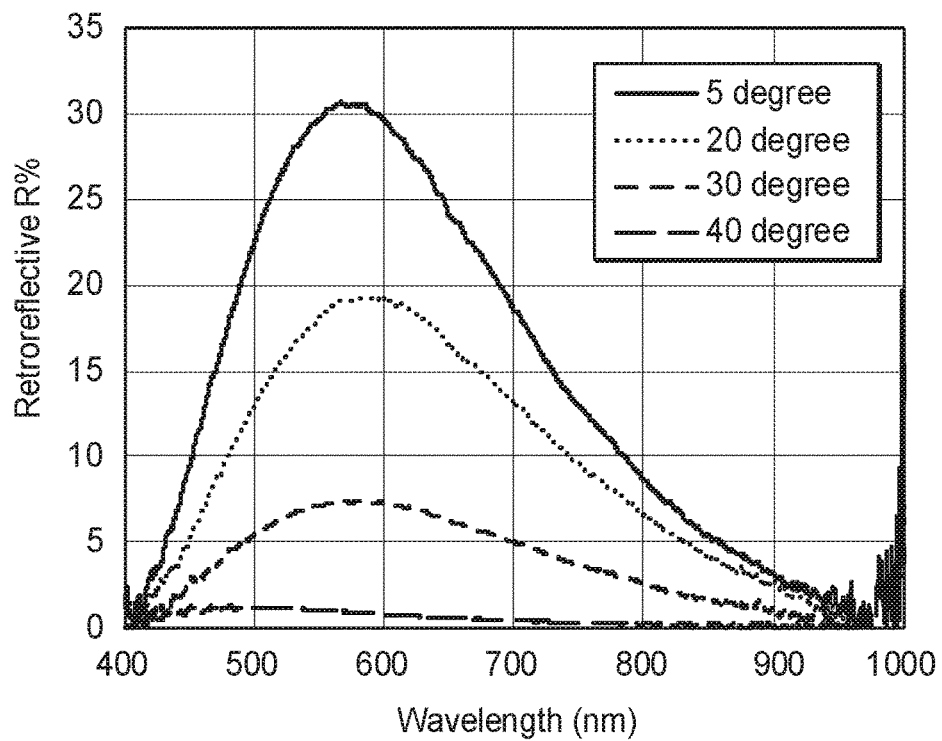
FIG. 10 presents retroreflectance as a function of wavelength and entrance angle, for a Comparative Example.

Inspection of FIG. 10 reveals that Comparative Example 1 exhibits a wavelength of peak reflection at approximately 580 nm, which is within the range targeted by the particular dielectric stack used in that sample. Furthermore, the wavelength of peak reflection does not change appreciably as the angle of incidence is changed from 5 degrees, to 20 degrees, then 30 degrees. These results demonstrate that the wavelength-selectivity of this sample is not dependent on the entrance angle of incident light over this range of entrance angle. Also, the reflectivity falls off rapidly with increasing entrance angle, indicating that the (single) reflective layer is present in a polar-cap configuration of the general type described previously herein.

Figure 11:
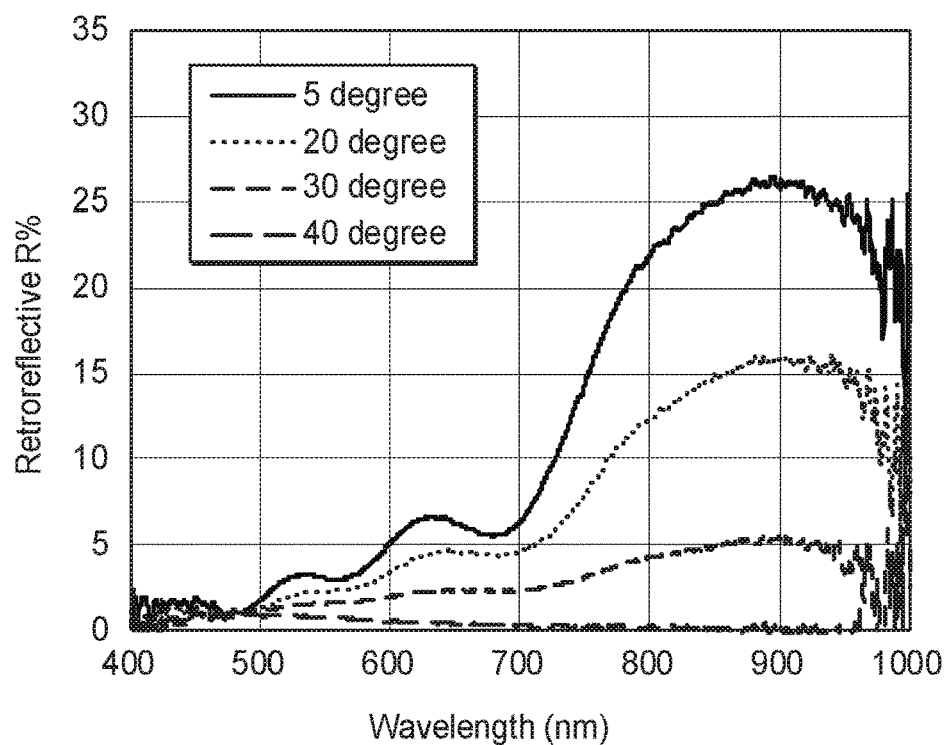
FIG. 11 presents retroreflectance as a function of wavelength and entrance angle, for another Comparative Example.

Inspection of FIG. 11 reveals that Comparative Example 2 exhibits a wavelength of peak reflection at approximately 900 nm, which is within the range targeted by the particular dielectric stack used in that sample. Furthermore, the wavelength of peak reflection does not change appreciably as the angle of incidence is changed from 5 degrees, to 20 degrees, then to 30 degrees. These results demonstrate that the wavelength-selectivity of this sample is not dependent on the entrance angle of incident light over this range. (Again, the reflection falls off rapidly with increasing entrance angle, indicating that the reflective layer is present in a polar-cap configuration of the general type described previously herein.)

Figure 12:
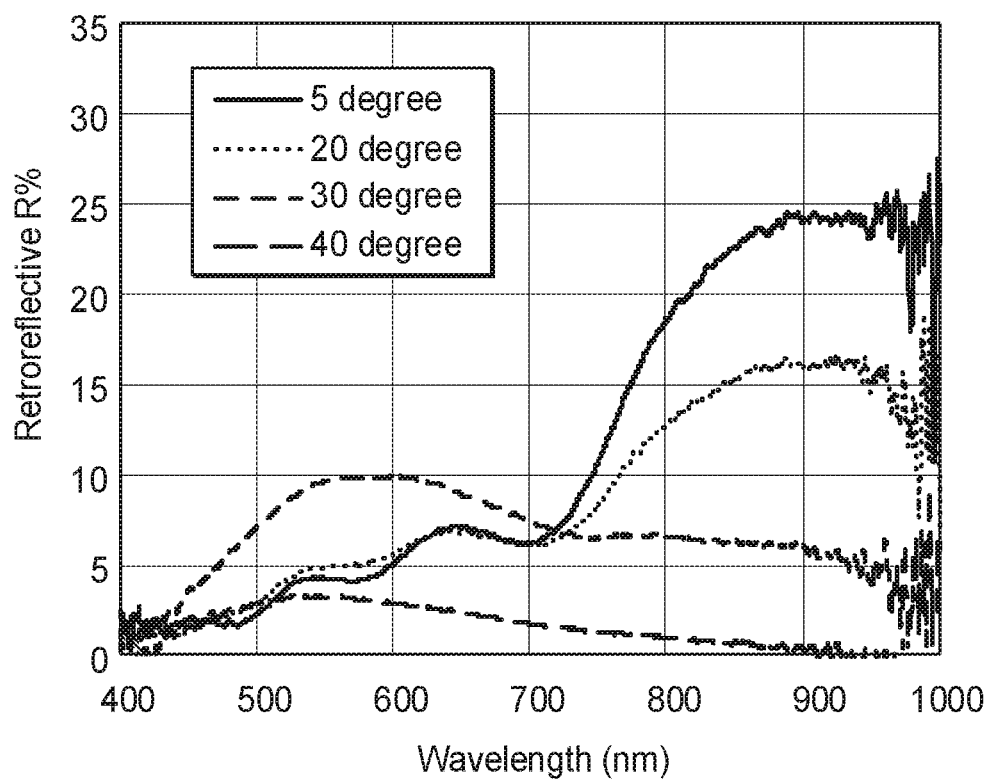
FIG. 12 presents retroreflectance as a function of wavelength and entrance angle, for a Working Example.

Inspection of FIG. 12 (Working Example 1) reveals that, at a 5 degree entrance angle, a wavelength of peak reflection at approximately 900 nm is exhibited. Very little reflection (e.g., Retroreflective R % of ~4-5 at 550-600 nm) is observed in the visible range. As the entrance angle is increased to 20, and then 30 degrees, the near-IR retroreflectivity drops sharply while the visible retroreflectivity increases sharply. These results demonstrate wavelength-selectivity that depends on the entrance angle of incident light. This behavior is indicative of microspheres with polar-cap near-IR reflectors that dominate the retroreflectivity at near head-on entrance angles of e.g. 5 degrees, and with spherical-segment visible reflectors that exert an increasing effect at higher entrance angles of e.g. 30 degrees.

Notably, for Working Example 1, the Retroreflective R % in the range of 400-700 nm was actually higher when measured at an entrance angle of 30 degrees than when measured at an entrance angle of 5 degrees.

Comparative Example 3

Comparative Example 3 was prepared following a similar procedure as described for Working Example 2.4.1 in the above-referenced '506 application, using a Transfer Stack that included a silver reflective layer, of a construction as shown in Table 3. (The combination of the Al release layer and the 1 mil BOPP substrate listed in the table, corresponded to "Heatseal Film-1" as referred to in the above-cited '506 and '553 applications.)

TABLE 3

| Transfer Stack w/ Silver Reflective layer Silver transfer reflector: | |
|---|---|
| 6 nm SiAlOx<br>90 nm Ag<br>90 nm acrylate release | 0.186 um silver reflective layer |
| Al release layer | |
| 1 mil BOPP substrate | |

The transfer stack was laminated to the Polymer Coated Bead Carrier. In a process that varied somewhat from that described in Example 2.4.1 part B of the '506 application, the lamination was performed at 30 fpm (12.6 mm per second) and used a backing roll that was fitted with a silicone rubber sleeve of 68A Shore hardness. The lamination nip pressure was approximately 500 PLI. The silver reflective layer of the Transfer Stack appeared to bond well to the organic polymer layer present on the protruding surfaces of the beads, and to separate from the surrounding reflective layer, so as to achieve the herein-described local lamination. After the lamination process, both the un-transferred reflective layer and the sacrificial layers of the Transfer Stack were removed from the microsphere-bearing carrier. A binder layer was then formed on the microsphere-bearing carrier, in generally similar manner as for Working Example 2.4.1 Part C of the '506 application. For convenience, the temporary carrier sheet was usually left in place on the article until such time as the article was to be tested, at which time the carrier sheet was removed and discarded. The resulting retroreflective article, comprising a broad-spectrum non-selective silver reflector layer, was designated as Comparative Example 3.

Working Example 2

Working Example 2 was prepared by the following procedure. In a first lamination procedure, the Transfer Stack with Silver Reflective Layer described above in Table 3, was laminated to the Polymer Coated Bead Carrier in generally similar manner as for Comparative Example 3. After the first lamination process, both the un-transferred reflective layer and the sacrificial layers of the Transfer Stack were removed from the microsphere-bearing carrier.

In a second, subsequent lamination procedure, a second Transfer Stack, the previously-described visible-reflective Transfer Stack R3502-5, was laminated to the above-described product of the first lamination procedure. This lamination was performed using the pair of 16 inch diameter smooth-faced steel rolls, at a line speed of 3 feet per minute and with a lamination pressure of 1000 pounds per linear inch (PLI). After the lamination process, both the un-transferred reflective layer and the sacrificial layers of the Transfer Stack were removed from the microsphere-bearing carrier. A binder layer was then formed on the microsphere-bearing carrier, in generally similar manner as for Working Example 2.4.1 Part C of the '506 application. For convenience, the temporary carrier sheet was usually left in place on the article until such time as the article was to be tested, at which time the carrier sheet was removed and discarded.

The resulting retroreflective article was designated as Working Example 2.

Working Example 2 was believed to comprise a significant number of transparent microspheres on which were disposed first reflective layers that were silver layers (providing broad-spectrum, non-selective reflectance) in a relatively small, polar-cap configuration resulting from the first, relatively low-pressure lamination process. The majority of transparent microspheres also appeared to have disposed on them second reflective layers, resulting from the second, more aggressive (higher pressure) lamination process. These layers (which were dielectric-stacks tailored for a visible wavelength of maximum reflection) were believed to include at least some spherical segments that at least generally circumscribed the first, silver reflective polar-cap layers.

Retroreflectance of Working Example 2 Versus Comparative Example 3

Working Example 2 and Comparative Example 3 were tested in a "32-angle" retroreflectivity test of the type described in the '506 application. In such a test, the retroreflectivity ($R_A$) is measured at a wide variety of entrance angles (5-40 degrees) and observation angles (0.2-1.5 degrees). Although not reproduced herein, this testing revealed that Working Example 2 consistently exhibited significantly higher retroreflectivity at higher entrance angles in comparison to Comparative Example 3. For example, at 30 degrees entrance angle with an observation angle from 0.2 to 1.5 degrees, the ratio of $R_A$ of Working Example 2 to $R_A$ of Comparative Example 3 was in a range of 3-5, significantly higher than 1. The results are consistent with the presence of the "in-parallel" portion of the second visible reflective layers, covering a larger angular arc of the microspheres than covered by the first silver reflective layers. It was also noted that Working Example 2 exhibited retroreflectivity in more head-on measurements (e.g. at 5 degrees entrance angle) that was often greater than that exhibited by Comparative Example 3, albeit to a smaller degree (e.g. with a ratio range of 1.2-1.4). It was believed that this indicated that the second lamination process, which was more aggressive than the first lamination process, may have succeeded in transferring the second visible reflective layers (comprising dielectric stacks) to some relatively small number of transparent microspheres that had come through the first lamination process without having a reflective layer transferred thereto. Working Example 2 exhibited the above-described enhanced retroreflectivity (at relatively head-on angles, and particularly at higher entrance angles, as discussed above) without unduly sacrificing color performance. Specifically, Working Example 2 exhibited Y, x and y values of 92, 0.37 and 0.52, which is an excellent result (indicating a bright (fluorescent yellow) color) that is close to the Y, x and y values (103, 0.38 and 0.53) exhibited by Comparative Example 3.

Comparative Example 4

Comparative Example 4 was prepared following a similar procedure as described for Working Example 2.4.1 in the above-referenced '506 application, using a Transfer Stack that included a silver reflective layer, of a construction as shown in Table 4.

TABLE 4

Transfer Stack w/ Silver Reflective layer
Silver transfer reflector:

| 4 nm SiAlOx | } | 0.164 um silver reflective layer |
| 70 nm Ag | | |
| 90 nm acrylate release | | |
| Al release layer | | |
| 1 mil BOPP substrate | | |

The transfer stack was laminated to the Polymer Coated Bead Carrier, following the same process as described in Comparative Example 3. The silver reflective layer of the Transfer Stack appeared to bond well to the organic polymer layer present on the protruding surfaces of the beads, and to separate from the surrounding reflective layer, so as to achieve the herein-described local lamination. After the lamination process, both the un-transferred reflective layer and the sacrificial layers of the Transfer Stack were removed from the microsphere-bearing carrier, to form a microsphere-bearing carrier with the silver reflector.

A fluorescent yellow binder layer was prepared, following in generally similar manner as for Example 12 of the above-referenced U.S. Provisional Application No. 62/785,344. 51 percent by weight (wt. %) of a copolymer (based on styrene and isoprene with a styrene content of 22%, commercially available as Kraton D1119 from Kraton Corporation, Houston, Texas), 34 wt. % of a tackifier (commercially available as Westerz 5206 from Ingevity, North Charleston, South Carolina), and 15 wt. % a fluorescent lime-yellow pigment powder (provided under the trade designation GT-17 SATURN YELLOW from Day Glo Color Corporation, Cleveland, Ohio) were loaded into a twin-screw extruder and mixed in the extruder at 182° C. for 3 minutes. The mixed composition was then extruded with a contact die at approximately 0.101 millimeter (mm) in coating thickness onto a virgin PET release liner, and then covered by a silicone-coated release liner.

A white binder layer was prepared, following in generally similar manner as for Example 12 of the '344 application. 51 wt. % of a copolymer (based on styrene and isoprene with a styrene content of 22%, commercially available as Kraton D1119 from Kraton Corporation, Houston, Texas), 34 wt. % of a tackifier (commercially available as Westerz 5206 from Ingevity, North Charleston, South Carolina), and 15 wt. % a white pigment powder (provided under the trade name Dupont Ti-Pure R900 available from The Chemours Company, Wilmington, DE) were loaded into a twin-screw extruder and mixed in the extruder at 182° C. for 3 minutes. The mixed composition was then extruded with a contact die at approximately 0.101 mm in coating thickness onto a virgin PET release liner, and then covered by a silicone-coated release liner.

A white fabric was obtained from Milliken & Co. (Spartanburg, SC).

A stack was thus prepared (after removing the release liners from the binder layers) comprising the following layers: the white fabric, the white binder layer, the fluorescent yellow binder layer, and the microsphere-bearing carrier (with the microspheres bearing silver reflector layers as described above). The stack was laminated at 163° C. and 40 pounds per square inch (PSI) for 20 seconds, using a Hix N-800 clamshell laminator. For convenience, the temporary carrier sheet was usually left in place on the article until such time as the article was to be tested, at which time the carrier sheet was removed and discarded. The resulting retroreflective article, comprising a broad-spectrum non-selective silver reflector layer, was designated as Comparative Example 4.

Working Example 3

A Transfer Stack (designated R3518-3) comprising visible reflective layers in the form of dielectric stacks was prepared following the same general process as described in Working Example 2.3.3.A (Part A) of the '506 application, resulting in a configuration as shown in Table 5. A three-layer elastomeric transfer adhesive film was prepared following the same process as described in Working Example 2.3.1.B (Part B) of the '506 application. The three-layer elastomeric transfer adhesive was laminated to the Transfer Stack R3518-3 using an Akiles ProLam Plus 330 13" Pouch Laminator (Mira Loma) with a setpoint of 77° C., with the NbOx surface in contact with the elastomeric transfer adhesive surface. The sacrificial layers of the Transfer Stack were then removed from the construction to form an elastomeric transfer adhesive with the weakly bound visible reflective layer.

TABLE 5

Transfer Stack R3518-3
Visible dielectric transfer reflector R3518-3:

| 58 nm NbOx | } | 0.507 um visible dielectric reflective layer |
| 91 nm acrylate | | |
| 58 nm NbOx | | |
| 300 nm acrylate release | | |
| Al release layer | | |
| 2 mil PET substrate | | |

Working Example 3 was prepared by the following procedure. In a first lamination procedure, the Transfer Stack with Silver Reflective Layer described above in Table 4, was laminated to the Polymer Coated Bead Carrier in generally similar manner as for Comparative Example 4. After the first lamination process, both the un-transferred reflective layer and the sacrificial layers of the Transfer Stack were removed from the microsphere-bearing carrier.

In a second, subsequent lamination procedure, the elastomeric transfer adhesive with the weakly bound visible reflective layer was laminated against the above-described product of the first lamination procedure, at 82° C. with a lamination force of 40 PLI. Then the elastomeric transfer adhesive film was removed from the microsphere-bearing carrier to form a microsphere-bearing carrier with the first silver reflector and the second visible reflector.

A stack was thus prepared (after removing the release liners from the binder layers) comprising the following layers: the white fabric, the white binder layer, the fluorescent yellow binder layer, and the microsphere-bearing carrier (with the microspheres bearing first and second reflectors as described above). The stack was laminated at 163° C. and 40 PSI for 20 seconds using a Hix N-800 clamshell laminator. For convenience, the temporary carrier sheet was usually left in place on the article until such time as the article was to be tested, at which time the carrier sheet was removed and discarded. The resulting retroreflective article, comprising a first broad-spectrum non-selective silver reflector layer and a second visible reflector layer, was designated as Working Example 3.

Working Example 3 was thus of a generally similar structure as Working Example 2, in which a significant number of the transparent microspheres comprised a first reflector layer that was a broad-spectrum, non-selective silver layer; and, a second reflector layer that exhibited preferential reflection at a particular visible-light wavelength. The difference between these two Working Examples is that the second reflectors of Working Example 3 were formed by a lamination process that was assisted by a conformal elastomeric substrate (referred to in the Example as an elastomeric transfer adhesive), at a relatively low lamination pressure; whereas, the second reflectors of Working Example 2 were produced by lamination between steel rolls at relatively high lamination pressure.

Retroreflectance of Working Example 3 Versus Comparative Example 4

32-angle retroreflectivity testing of the type described above for Working Example 2, was also performed for Working Example 3 (and for Comparative Example 4). The $R_A$ ratios of Working Example 3 to Comparative Example 4 at 40 degree entrance angles (and at an observation angle from 0.2 to 1.5 degrees) were found to be in the range of 8-21. This is significantly higher than the above-discussed $R_A$ ratios of Working Example 2 to Comparative Example 3, which (at corresponding entrance/observation angles), were less than 2.5. Thus, Working Example 3 demonstrated enhanced preservation of retroreflectivity at quite high entrance angles (e.g. of up to 40 degrees), in comparison to Working Example 2. This illustrates the ability of elastomer-assisted lamination to dispose reflectors on microspheres at quite high "wrap" angles, without necessitating the use of extremely high pressure.

The foregoing Examples have been provided for clarity of understanding only, and no unnecessary limitations are to be understood therefrom. The tests and test results described in the Examples are intended to be illustrative rather than predictive, and variations in the testing procedure can be expected to yield different results. All quantitative values in the Examples are understood to be approximate in view of the commonly known tolerances involved in the procedures used.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document that is incorporated by reference herein, this specification as written will control.

What is claimed is:

1. A retroreflective article comprising:
   a binder layer; and,
   a plurality of retroreflective elements spaced over a length and breadth of a front side of the binder layer, each retroreflective element comprising a transparent microsphere partially embedded in the binder layer so as to exhibit an embedded area of the transparent microsphere;
   wherein at least some of the retroreflective elements each comprise a first locally-laminated layer that is embedded between the transparent microsphere and the binder layer; and, a second locally-laminated layer that is embedded between the transparent microsphere and the binder layer;
   the first and second locally-laminated reflective layers being in the form of discontinuous, discrete reflective layers that exhibit one or more edges indicating that the reflective layer was locally broken off from a layer of reflective material that previously laterally surrounded the reflective layer, with at least some of the first and second locally-laminated reflective layers exhibiting discontinuities in the form of cracks, gaps or fracture lines;
      wherein for at least some of the microspheres on which the first and second locally-laminated, embedded layers are present, at least a portion of the second locally-laminated, embedded layer is positioned in parallel to the first locally-laminated, embedded layer so that incoming light rays can reach the in-parallel portion of the second locally-laminated, embedded layer without having to pass through any portion of the first locally-laminated, embedded layer.

2. The retroreflective article of claim 1 wherein the first locally-laminated, embedded layer and/or the second locally-laminated, embedded layer is a reflective layer.

3. The retroreflective article of claim 2 wherein the first locally-laminated, embedded layer is a first reflective layer and wherein the second locally-laminated, embedded layer is a second reflective layer.

4. The retroreflective article of claim 3 wherein at least 50 percent of the retroreflective elements of the retroreflective article each comprise a first locally-laminated, embedded reflective layer and/or a second locally-laminated, embedded reflective layer.

5. The retroreflective article of claim 3 wherein at least some of the first locally-laminated, embedded reflective layers are localized layers and at least some of the second locally-laminated, embedded reflective layers are localized layers.

6. The retroreflective article of claim 1 wherein for at least some of the microspheres on which the first and second locally-laminated, embedded layers are present, at least a portion of the second locally-laminated, embedded reflective is positioned rearward of, and in series with, the first locally-laminated, embedded layer, so that incoming light rays have to pass through the first locally-laminated, embedded layer to reach the in-series portion of the second locally-laminated, embedded layer.

7. The retroreflective article of claim 1 wherein for microspheres on which the first and second locally-laminated, embedded layers are present, the first and second locally-laminated, embedded layers each occupy an angular arc of at most 180 degrees.

8. The retroreflective article of claim 1 wherein for at least some of the microspheres on which the first and second locally-laminated, embedded layers are present, the first locally-laminated, embedded layer occupies an angular arc of less than 40 degrees and the second locally-laminated, embedded layer occupies an angular arc of greater than 60 degrees.

9. The retroreflective article of claim 1 wherein at least some of the locally-laminated, embedded layers each comprise a selective-bonding layer that has first and second major surfaces that exhibit differential bonding from each other.

10. The retroreflective article of claim 1 wherein at least some of the locally-laminated, embedded layers each comprise an embrittlement layer.

11. The retroreflective article of claim 1 wherein at least some of the locally-laminated, embedded layers are reflective layers that each comprise a metal reflecting layer.

12. The retroreflective article of claim 1 wherein at least some of the locally-laminated, embedded layers are wavelength-selective reflective layers that exhibit a predetermined wavelength of peak reflection.

13. The retroreflective article of claim 1 wherein the first locally-laminated, embedded layers are first reflective layers that each comprise a metal reflecting layer, and wherein the second locally-laminated, embedded layers are wavelength-selective reflective layers that exhibit a predetermined wavelength of peak reflection.

14. The retroreflective article of claim 1 wherein the first locally-laminated, embedded layers are first wavelength-selective reflective layers that exhibit a first predetermined wavelength of peak reflection; and, wherein the second locally-laminated, embedded layers are second wavelength-selective reflective layers that exhibit a second predetermined wavelength of peak reflection and wherein the second predetermined wavelength of peak reflection differs from the first predetermined wavelength of peak reflection by at least 50 nm.

15. The retroreflective article of claim 1 wherein at least the second locally-laminated, embedded layers are reflective layers, and wherein the first locally-laminated, embedded layers and the second locally-laminated, embedded reflective layers are configured so that at least at one wavelength between 400 nm and 700 nm, the retroreflective article exhibits a percent retroreflectance at a 30 degree entrance angle, that is greater than a percent reflectance exhibited at a 5 degree entrance angle, by at least 2 percent.

16. The retroreflective article of claim 1 wherein at least some of the retroreflective elements comprise an intervening layer at least a portion of which is disposed between the transparent microsphere and the binder layer so that the first locally-laminated, embedded layer, and the second locally-laminated, embedded layer, are positioned rearward of the intervening layer, between the intervening layer and the binder layer.

17. The retroreflective article of claim 1 wherein the binder layer comprises a colorant.

18. A transfer article comprising the retroreflective article of claim 1 and a disposable carrier layer on which the retroreflective article is detachably disposed with at least some of the transparent microspheres in contact with the disposable carrier layer.

19. A substrate comprising the retroreflective article of claim 1, wherein the binder layer of the retroreflective article is coupled to the substrate with at least some of the retroreflective elements of the retroreflective article facing away from the substrate.

20. A retroreflective article comprising:
a binder layer; and,
a plurality of retroreflective elements spaced over a length and breadth of a front side of the binder layer, each retroreflective element comprising a transparent microsphere partially embedded in the binder layer so as to exhibit an embedded area of the transparent microsphere;
wherein at least some of the retroreflective elements each comprise a first locally-laminated layer that is embedded between the transparent microsphere and the binder layer; and, a second locally-laminated layer that is embedded between the transparent microsphere and the binder layer;
the first and second locally-laminated reflective layers being in the form of discontinuous, discrete reflective layers that exhibit one or more edges indicating that the reflective layer was locally broken off from a layer of reflective material that previously laterally surrounded the reflective layer, with at least some of the first and second locally-laminated reflective layers exhibiting discontinuities in the form of cracks, gaps or fracture lines;
wherein for at least some of the microspheres on which the first and second locally-laminated, embedded layers are present, the first locally-laminated, embedded layer occupies an angular arc of less than 40 degrees and the second locally-laminated, embedded layer occupies an angular arc of greater than 60 degrees.

21. A retroreflective article comprising:
a binder layer; and,
a plurality of retroreflective elements spaced over a length and breadth of a front side of the binder layer, each retroreflective element comprising a transparent microsphere partially embedded in the binder layer so as to exhibit an embedded area of the transparent microsphere;

wherein at least some of the retroreflective elements each comprise a first locally-laminated layer that is embedded between the transparent microsphere and the binder layer; and, a second locally-laminated layer that is embedded between the transparent microsphere and the binder layer;

the first and second locally-laminated reflective layers being in the form of discontinuous, discrete reflective layers that exhibit one or more edges indicating that the reflective layer was locally broken off from a layer of reflective material that previously laterally surrounded the reflective layer, with at least some of the first and second locally-laminated reflective layers exhibiting discontinuities in the form of cracks, gaps or fracture lines;

wherein the first locally-laminated, embedded layers are first reflective layers that each comprise a metal reflecting layer, and wherein the second locally-laminated, embedded layers are wavelength-selective reflective layers that exhibit a predetermined wavelength of peak reflection.

22. A retroreflective article comprising:

a binder layer; and, a plurality of retroreflective elements spaced over a length and breadth of a front side of the binder layer, each retroreflective element comprising a transparent microsphere partially embedded in the binder layer so as to exhibit an embedded area of the transparent microsphere;

wherein at least some of the retroreflective elements each comprise a first locally-laminated layer that is embedded between the transparent microsphere and the binder layer; and, a second locally-laminated layer that is embedded between the transparent microsphere and the binder layer;

the first and second locally-laminated reflective layers being in the form of discontinuous, discrete reflective layers that exhibit one or more edges indicating that the reflective layer was locally broken off from a layer of reflective material that previously laterally surrounded the reflective layer, with at least some of the first and second locally-laminated reflective layers exhibiting discontinuities in the form of cracks, gaps or fracture lines;

wherein at least the second locally-laminated, embedded layers are reflective layers, and wherein the first locally-laminated, embedded layers and the second locally-laminated, embedded reflective layers are configured so that at least at one wavelength between 400 nm and 700 nm, the retroreflective article exhibits a percent retroreflectance at a 30 degree entrance angle, that is greater than a percent reflectance exhibited at a 5 degree entrance angle, by at least 2 percent.

* * * * *